United States Patent
Reynolds

(10) Patent No.: US 10,553,239 B2
(45) Date of Patent: *Feb. 4, 2020

(54) SYSTEMS AND METHODS FOR IMPROVING AUDIO CONFERENCING SERVICES

(71) Applicant: Family Systems, Ltd., Douglas (IM)

(72) Inventor: Brian Reynolds, Hanover (JM)

(73) Assignee: FAMILY SYSTEMS, LTD., Douglas, Isle of Man (GB)

(*) Notice: Subject to any disclaimer, the term of this patent is extended or adjusted under 35 U.S.C. 154(b) by 214 days.

This patent is subject to a terminal disclaimer.

(21) Appl. No.: 15/364,654

(22) Filed: Nov. 30, 2016

(65) Prior Publication Data

US 2017/0236532 A1    Aug. 17, 2017

Related U.S. Application Data

(63) Continuation of application No. 14/791,910, filed on Jul. 6, 2015, now Pat. No. 9,538,129, which is a (Continued)

(51) Int. Cl.
*G10L 25/87*    (2013.01)
*G10L 25/84*    (2013.01)
(Continued)

(52) U.S. Cl.
CPC .......... *G10L 25/87* (2013.01); *G06F 16/686* (2019.01); *G10L 21/0272* (2013.01); *G10L 25/84* (2013.01); *G11B 27/005* (2013.01); *G11B 27/19* (2013.01); *H04L 65/403* (2013.01); *H04M 3/42221* (2013.01); *H04M 3/566* (2013.01);
(Continued)

(58) Field of Classification Search
CPC .................................................. G06F 17/3074
See application file for complete search history.

(56) References Cited

U.S. PATENT DOCUMENTS 5,627,936 A    5/1997 Prasad et al.
5,786,814 A    7/1998 Moran et al.
(Continued)

FOREIGN PATENT DOCUMENTS

WO    WO 2014076129    5/2014

OTHER PUBLICATIONS

International Search Report and Written Opinion dated Oct. 1, 2014 in International Application No. PCT/IB2014/062776.

*Primary Examiner* — Matthew H Baker
(74) *Attorney, Agent, or Firm* — White & Case LLP

(57) ABSTRACT

Systems and methods are disclosed herein for improving audio conferencing services. One aspect relates to processing audio content of a conference. A first audio signal is received from a first conference participant, and a start and an end of a first utterance by the first conference participant are detected from the first audio signal. A second audio signal is received from a second conference participant, and a start and an end of a second utterance by the second conference participant is detected from the second audio signal. The second conference participant is provided with at least a portion of the first utterance, wherein at least one of start time, start point, and duration is determined based at least in part on the start, end, or both, of the second utterance.

14 Claims, 12 Drawing Sheets

Related U.S. Application Data continuation of application No. 14/321,348, filed on Jul. 1, 2014, now Pat. No. 9,087,521.

(60) Provisional application No. 61/842,331, filed on Jul. 2, 2013.

(51) Int. Cl.

| | |
|---|---|
| H04L 29/06 | (2006.01) |
| G06F 16/68 | (2019.01) |
| H04M 3/56 | (2006.01) |
| H04N 7/14 | (2006.01) |
| H04N 7/15 | (2006.01) |
| G10L 21/0272 | (2013.01) |
| G11B 27/00 | (2006.01) |
| G11B 27/19 | (2006.01) |
| H04M 3/42 | (2006.01) |
| G10L 25/78 | (2013.01) |
| H04L 12/18 | (2006.01) |
| G10L 15/22 | (2006.01) |

(52) U.S. Cl.
CPC .......... *H04M 3/568* (2013.01); *H04M 3/569* (2013.01); *H04N 7/147* (2013.01); *H04N 7/15* (2013.01); *G06F 16/68* (2019.01); *G10L 2015/227* (2013.01); *G10L 2025/783* (2013.01); *H04L 12/1831* (2013.01); *H04M 2203/303* (2013.01); *H04M 2203/305* (2013.01); *H04M 2203/5072* (2013.01)

(56) References Cited

U.S. PATENT DOCUMENTS

| | | | |
|---|---|---|---|
| 6,298,129 | B1 | 10/2001 | Culver et al. |
| 6,418,125 | B1 | 7/2002 | Oran |
| 6,959,075 | B2 | 10/2005 | Cutaia et al. |
| 7,003,286 | B2 | 2/2006 | Brown et al. |
| 7,206,809 | B2 | 4/2007 | Ludwig et al. |
| 7,391,763 | B2 | 6/2008 | Brown et al. |
| 7,418,090 | B2 | 8/2008 | Reding et al. |
| 7,466,334 | B1 | 12/2008 | Baba |
| 7,679,637 | B1 | 3/2010 | Kohler |
| 7,730,407 | B2 | 6/2010 | Chiu |
| 7,817,584 | B2 | 10/2010 | Campbell |
| 7,852,992 | B1 | 12/2010 | Edamadaka et al. |
| 7,882,050 | B2 | 2/2011 | Kubota et al. |
| 8,121,277 | B2 | 2/2012 | Baird |
| 8,135,115 | B1 | 3/2012 | Hogg, Jr. |
| 8,185,143 | B1 | 5/2012 | Othmer |
| 8,306,640 | B2 | 11/2012 | Okamoto |
| 8,406,390 | B1 | 3/2013 | Halferty et al. |
| 8,451,317 | B2 | 5/2013 | Smith |
| 8,699,383 | B2 | 4/2014 | Katis |
| 8,719,032 | B1* | 5/2014 | Bader ................... H04L 65/403 370/260 |
| 8,725,508 | B2* | 5/2014 | Ben-Ezra ............. A61B 5/7246 704/214 |
| 8,750,678 | B2 | 6/2014 | Li |
| 8,773,993 | B2 | 7/2014 | Shojania |
| 8,797,380 | B2 | 8/2014 | Quinn |
| 8,838,179 | B2 | 9/2014 | Epp |
| 8,929,529 | B2 | 1/2015 | Beerse et al. |
| 2002/0165721 | A1 | 11/2002 | Chang |
| 2004/0193683 | A1 | 9/2004 | Blumofe |
| 2005/0053214 | A1 | 3/2005 | Reding et al. |
| 2006/0003751 | A1 | 1/2006 | Vo |
| 2006/0062366 | A1 | 3/2006 | Tiruthani et al. |
| 2008/0095348 | A1 | 4/2008 | Abernethy et al. |
| 2008/0137558 | A1* | 6/2008 | Baird ................... H04L 12/1831 370/260 |
| 2008/0205444 | A1 | 8/2008 | Campbell et al. |
| 2008/0310398 | A1 | 12/2008 | Jain |
| 2009/0027763 | A1 | 1/2009 | Zhang et al. |
| 2009/0060157 | A1 | 3/2009 | Kim et al. |
| 2009/0150151 | A1* | 6/2009 | Sakuraba .............. G10L 21/028 704/246 |
| 2009/0168984 | A1 | 7/2009 | Kreiner et al. |
| 2009/0207763 | A1 | 8/2009 | Li et al. |
| 2009/0313010 | A1* | 12/2009 | Burckart ................ G11B 19/08 704/227 |
| 2011/0112833 | A1 | 5/2011 | Frankel et al. |
| 2011/0267419 | A1 | 11/2011 | Quinn |
| 2012/0063573 | A1 | 3/2012 | Sylvain |
| 2012/0150863 | A1 | 6/2012 | Fish |
| 2012/0212571 | A1 | 8/2012 | Wang |
| 2012/0296914 | A1 | 11/2012 | Romanov |
| 2014/0078938 | A1* | 3/2014 | Lachapelle .......... A61B 18/245 370/260 |
| 2018/0191912 | A1* | 7/2018 | Cartwright ............ G10L 21/043 |
| 2018/0279063 | A1* | 9/2018 | Sun ....................... H04M 3/568 |

\* cited by examiner

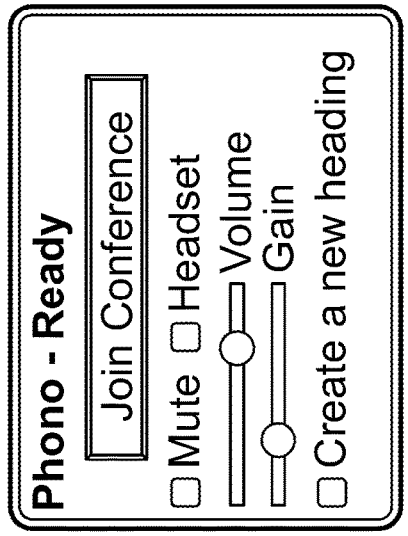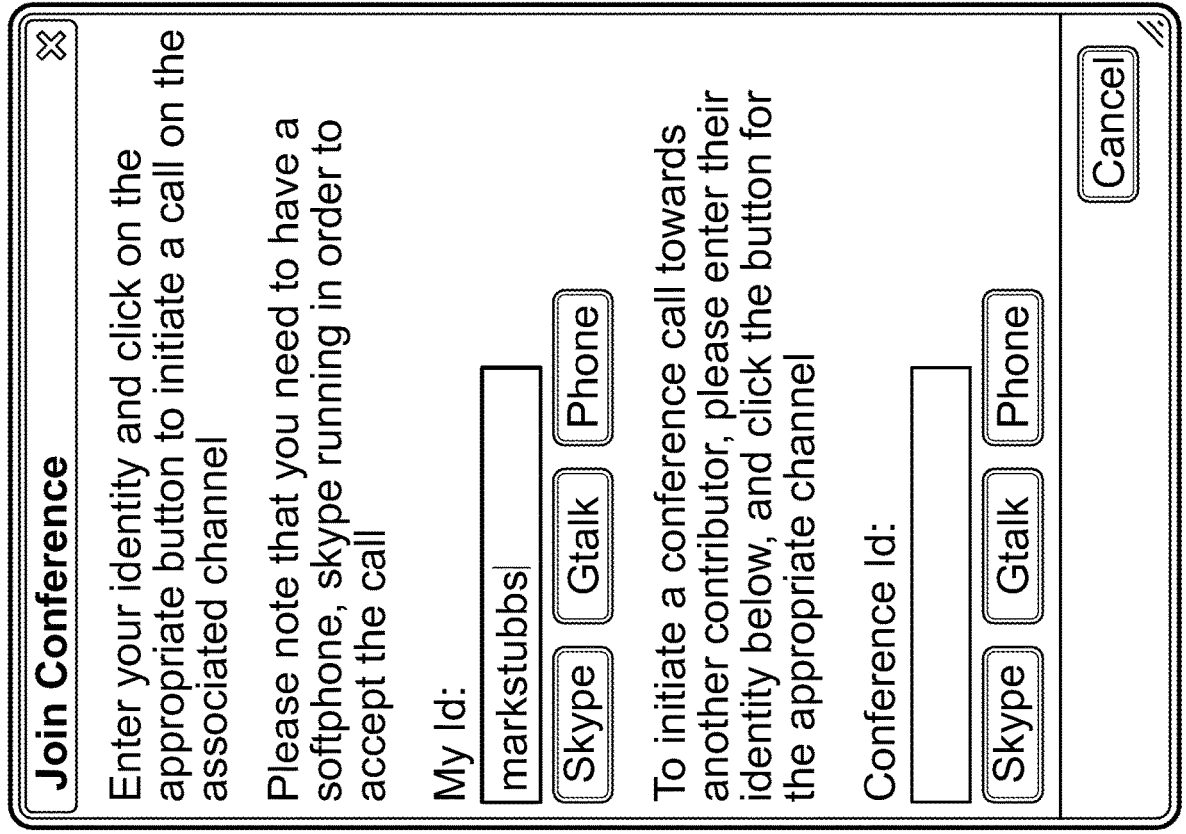
FIG. 2

FIG. 3A

Settings

*conversations* | *pages*

| Extension | Owner | Type | Interval |
|---|---|---|---|
| 101-100001 | Brian Reynolds | digest | never |
| 101-100002 | Brian Reynolds | digest | never |
| 117-100001 | Philip Doyle | digest | never |
| 117-100002 | Philip Doyle | digest | never |
| 117-100003 | Philip Doyle | digest | never |
| 117-100004 | Philip Doyle | digest | never |
| 117-100005 | Philip Doyle | digest | never |
| 117-100006 | Philip Doyle | digest | never |
| 118-111000 | Thomas Bibb | digest | never |
| 118-111999 | Thomas Bibb | digest | never |
| 120-100001 | Mark Stubbs | digest | never |
| 120-100002 | Mark Stubbs | digest | every 10 min |
| 120-100003 | Mark Stubbs | digest | never |
| 120-100004 | Mark Stubbs | digest | never |
| 120-100005 | Mark Stubbs | digest | every 10 min |
| 120-100006 | Mark Stubbs | digest | never |
| 120-100007 | Mark Stubbs | digest | never |

[ OK ] [ Cancel ]

FIG. 4

UI Settings

Settings
- My Id: markstubbs
- Conference Id: markstubbs
- ☑ Browser is configured to Allow Pop-ups
- ☐ Links share one pop-up Nickname: Mark
Default tempo: 115%

Speaker specific settings

| Speaker | Tempo | Pitch shift | Filter | Silence | Volume |
|---------|-------|-------------|--------|---------|--------|
| ☐ Mark | 115% | 0 | ☐ | ☑ | 8 |
| ☐ Brian | 100% | 0 | ☐ | ☑ | 8 |
| ☑ Kalpana | 115% | 0 | ☐ | ☑ | 8 |

Save & Close

Fig. 6

| All-Playlist | Tagged | Summarized | Google Transcribed | Nxt.105 | Nxt.83 | Nxt.86 | Q | Watson Transcribed | URL Only | None | Reset | Mark | Brian | Kalpana |
|---|---|---|---|---|---|---|---|---|---|---|---|---|---|---|
| Reset | All | MARK ACTION | | | | | | Reset | | | | | | |

SYSTEMS AND METHODS FOR IMPROVING AUDIO CONFERENCING SERVICES

CROSS REFERENCE TO RELATED APPLICATIONS

This application is a continuation of co-pending U.S. patent application Ser. No. 14/791,910, filed Jul. 6, 2015 (now allowed), which application is a continuation of U.S. patent application Ser. No. 14/321,348, filed Jul. 1, 2014, now U.S. Pat. No. 9,087,521, which claims the benefit under 35 U.S.C. § 119(e) of U.S. Provisional Application No. 61/842,331, filed on Jul. 2, 2013, which is hereby incorporated herein by reference in its entirety. This application is related to co-pending PCT Application No. PCT/IB2014/062776 filed Jul. 1, 2014, which is hereby incorporated herein by reference in its entirety.

FIELD OF THE INVENTION

This disclosure relates to services provided during and after audio conferencing.

BACKGROUND

Conferencing is an important way for a set of individuals who are remote from one another to communicate. Existing conferencing systems connect the conference participants in real time, and play the same audio or video to all participants in real time. These conferencing systems are associated with several disadvantages or problems. First, during a conference, participants may tend to interrupt one another. Such interruptions cause the participants to lose their train of thought, and ideas are lost. In particular, when one participant is interrupted by another, the original participant may be distracted listening to what the interrupter is saying and would likely lose his original thought. Alternatively, if the interrupter waits to speak until the original participant is done, the interrupter may lose his own thought and may never find a moment to contribute it to the conversation. Second, it can be difficult for listeners to effectively understand what the participants are saying when two or more conference participants are trying to speak over one another. When this happens, whichever speaker prevails may be affected by circumstances such as rank of the participants, which would impede the useful flow of the information. Third, conferencing systems may sometimes have poor channel conditions that cause delays, which may increase the frequency of interruptions. Also, someone participating in a conference may be distracted at his location and miss important content. Furthermore, someone who is interested in only a part of the content of the conference has to attend the whole conference to hear or say his part. Techniques are needed to improve existing conferencing services to remedy these problems.

SUMMARY

Systems and methods are disclosed herein for improving audio conferencing services. One aspect relates to processing audio content of a conference. A first audio signal is received from a first conference participant, and a start and an end of a first utterance by the first conference participant are detected from the first audio signal. A second audio signal is received from a second conference participant, and a start and an end of a second utterance by the second conference participant is detected from the second audio signal. The second conference participant is provided with at least a portion of the first utterance at a time that is determined based at least in part on the start, the end, or both the start and the end of the second utterance.

In one embodiment, the time corresponds to at least one of a start time for providing the portion of the first utterance, a start point of the portion of the first utterance, and a duration of the first utterance.

In one embodiment, the portion of the first utterance is provided to the second conference participant before the start of the second utterance or after the end of the second utterance. The first utterance and the second utterance may overlap in time, and the providing of the portion of the first utterance may be based on determining that the first and second utterances overlap in time. In particular, the start of the second utterance may occur after the start of the first utterance and before the end of the first utterance, and the portion of the first utterance may be based on a previous portion of the first utterance that is provided to the second conference participant before the start of the second utterance. In an example, upon detection of the start of the second utterance, the first and the second conference participants may be switched to a mode in which utterances are played sequentially to the first and second conference participants.

In one embodiment, in response to detecting the start of the second utterance, the providing of the portion of the first utterance to the second conference participant is stopped. An indication may be stored of a point in the portion of the first utterance at which the providing to the second conference participant was stopped, where in response to detecting the end of the second utterance, the providing of the portion of the first utterance to the second conference participant is resumed at the point referenced by the stored indication. In an example, resuming the providing of the portion of the first utterance to the second conference participant at the point referenced by the stored indication may include accessing a recorded version of the first audio signal at the point referenced by the stored indication, playing the portion of the first utterance from the point referenced by the stored indication (optionally at an accelerated rate), and providing conference audio to the second conference participant in real time when playback of the recorded version terminates. The recorded version of the first audio signal may be stored as a plurality of audio clips in a playlist, each audio clip including an utterance by one of the conference participants. Playing the portion of the first utterance may include playing the plurality of audio clips sequentially from the point referenced by the stored indication. In an example, the recorded version of the first audio signal is stored as at least some of a plurality of audio clips in a playlist, each audio clip including an utterance by one of a plurality of conference participants. The plurality of audio clips may be played from the point referenced by the stored indication in the same manner in which they were recorded, where two or more of the pluralities of audio clips are played in an overlapping manner when the corresponding conference audio included overlapping utterances from multiple conference participants.

In one embodiment, the start of the first utterance by the first conference participant is detected by monitoring a volume level of an audio stream sourced from the first conference participant, comparing the monitored volume level of the audio stream to a threshold value, and determining the start of the utterance when the monitored volume level of the audio stream exceeds the threshold value. The end of the first utterance by the first conference participant may be detected by monitoring the volume level of the audio stream sourced from the first conference participant, comparing the monitored volume level of the audio stream to the threshold value, and determining the end of the utterance when the monitored volume level of the audio stream falls below the threshold value for a predefined duration of time.

In one embodiment, detecting the start of the first utterance includes receiving a first selection from the first conference participant to unmute an audio input interface or to pause an audio output. Detecting the end of the first utterance may include receiving a second selection from the first conference participant to mute the audio input interface or to play the audio output. In response to detecting the start of the first utterance, a recording of the first utterance by the first conference participant may be initiated, and in response to detecting the end of the first utterance, the recording of the first utterance by the first conference participant may be terminated.

In one embodiment, the recorded utterance is stored as an audio clip in a playlist, where the playlist includes a plurality of audio clips of utterances by other conference participants. The stored audio clip in the playlist may be automatically categorized under a section identifying the conference or a subject of the conference, and may be automatically tagged with information identifying the first conference participant. User input may be received that is indicative of data to associate with the stored audio clip in the playlist, and the data may be stored with an association to the stored audio clip. The stored data may include at least one of a subject, description, transcription, keyword, flag, digital file, and uniform resource locator.

One aspect relates to a system for processing audio content of a conference. The system comprises an audio detector configured to receive a first audio signal from a first conference participant, detect, from the first audio signal, a start and an end of a first utterance by the first conference participant, receive a second audio signal from a second conference participant, and detect, from the second audio signal, a start and an end of a second utterance by the second conference participant. The system further comprises a transmitter configured to provide, to the second conference participant, a portion of the first utterance including a delayed version of at least a portion of the first utterance at a time determined based at least in part on the start, the end, or both the start and the end of the second utterance.

One aspect relates to a non-transitory computer-readable medium comprising computer-readable instructions encoded thereon for processing audio content of a conference. The computer-readable instructions comprise instructions for receiving a first audio signal from a first conference participant, detecting, from the first audio signal, a start and an end of a first utterance by the first conference participant, receiving a second audio signal from a second conference participant, and detecting, from the second audio signal, a start and an end of a second utterance by the second conference participant. The computer-readable instructions further comprises instructions for providing, to the second conference participant, at least a portion of the first utterance at a time determined based at least in part on the start, the end or both the start and end of the second utterance.

One aspect relates to a system or method for processing audio content of a conference. A processor provides audio from the conference to a first conference participant, detects a start of an utterance by the first conference participant, and in response to detecting the start of the utterance, stops the provision of the audio from the conference to the first conference participant. An indication of a point in the audio from the conference at which the provision of the audio from the conference to the first conference participant was stopped is stored, and an end of the utterance by the first conference participant is detected. In response to detecting the end of the utterance, the processor resumes the provision of the audio from the conference to the first conference participant at the point referenced by the stored indication.

In one embodiment, detecting a start of an utterance by the first conference participant comprises monitoring a volume level of an audio stream sourced from the first conference participant, comparing the monitored volume level of the audio stream to a threshold value, and determining the start of the utterance when the monitored volume level of the audio stream exceeds the threshold value. Detecting an end of the utterance by the first conference participant may comprise monitoring the volume level of the audio stream sourced from the first conference participant, comparing the monitored volume level of the audio stream to the threshold value, and determining the end of the utterance when the monitored volume level of the audio stream falls below the threshold value for a predefined duration of time.

In one embodiment, detecting a start of an utterance by the first conference participant comprises receiving a first selection from the first conference participant to unmute an audio input interface or to pause an audio output. An end of the utterance by the first conference participant may be detected by receiving a second selection from the first conference participant to mute the audio input interface or to play the audio output.

In one embodiment, in response to detecting the start of the utterance, the processor initiates a recording of the utterance by the first conference participant. In response to detecting the end of the utterance, the processor terminates the recording of the utterance by the first conference participant. The recorded utterance may be stored as an audio clip in a playlist, where the playlist includes a plurality of audio clips of utterances by other conference participants. The stored audio clip in the playlist may be automatically categorized under a section identifying the conference or a subject of the conference, and the stored audio clip may be automatically tagged with information identifying the first conference participant.

In one embodiment, resuming the provision of the audio from the conference to the first conference participant at the point referenced by the stored indication comprises accessing a recorded version of the audio from the conference at the point referenced by the stored indication, playing the recorded version of the audio from the conference from the point referenced by the stored indication at an accelerated rate, and providing the audio from the conference to the first conference participant in real time when playback of the recorded version terminates. The recorded version of the audio from the conference may be stored as a plurality of audio clips in a playlist, where each audio clip includes an utterance by one of a plurality of conference participants. Playing the recorded version of the audio from the conference may comprise playing the plurality of audio clips sequentially from the point referenced by the stored indication. In some embodiments, the recorded version of the audio from the conference is stored as a plurality of audio clips in a playlist, where each audio clip includes an utterance by one of a plurality of conference participants. Playing the recorded version of the audio from the conference may comprise playing the plurality of audio clips from the point referenced by the stored indication in the same manner in which they were recorded, wherein two or more of the plurality of audio clips are played in an overlapping manner when the corresponding audio from the conference included overlapping utterances from multiple conference participants. In some embodiments, the processor receives user input of data to associate with the stored audio clip in the playlist and stores the data with an association to the stored audio clip. The stored data comprises at least one of a subject, description, transcription, keyword, flag, digital file, and uniform resource locator.

One aspect relates to a system for processing audio content of a conference. The system comprises a transmitter configured to provide audio from the conference to a first conference participant and an audio detector configured to detect a start of an utterance by the first conference participant and detect an end of the utterance by the first conference participant. The system further comprises a processor configured to, in response to detecting the start of the utterance, stop the provision of the audio from the conference to the first conference participant. The processor is further configured to store, in a memory, an indication of a point in the audio from the conference at which the provision of the audio from the conference to the first conference participant was stopped, and in response to detecting the end of the utterance, resume the provision of the audio from the conference to the first conference participant at the point referenced by the stored indication.

In one embodiment, the audio detector is configured to detect a start of an utterance by the first conference participant by monitoring a volume level of an audio stream sourced from the first conference participant, comparing the monitored volume level of the audio stream to a threshold value, and determining the start of the utterance when the monitored volume level of the audio stream exceeds the threshold value. The audio detector may be configured to detect an end of the utterance by the first conference participant by monitoring the volume level of the audio stream sourced from the first conference participant, comparing the monitored volume level of the audio stream to the threshold value, and determining the end of the utterance when the monitored volume level of the audio stream falls below the threshold value for a predefined duration of time.

In one embodiment, the audio detector is configured to detect a start of an utterance by the first conference participant by receiving a first selection from the first conference participant to unmute an audio input interface or to pause an audio output. The audio detector may be configured to detect an end of the utterance by the first conference participant by receiving a second selection from the first conference participant to mute the audio input interface or to play the audio output.

In one embodiment, the processor is further configured to in response to detecting the start of the utterance, initiate a recording of the utterance by the first conference participant, and in response to detecting the end of the utterance, terminate the recording of the utterance by the first conference participant. The processor may be further configured to store a reference to the recorded utterance as an audio clip in a playlist, wherein the playlist includes a plurality of audio clips of utterances by other conference participants. The processor may be further configured to automatically categorize the stored audio clip in the playlist under a section identifying the conference or a subject of the conference, and automatically tag the stored audio clip with information identifying the first conference participant.

In one embodiment, the processor is configured to store a first index point corresponding to the start of the utterance in response to detecting the start of the utterance, and store a second index point corresponding to the end of the utterance in response to detecting the end of the utterance.

In one embodiment, the processor is configured to resume the provision of the audio from the conference to the first conference participant at the point referenced by the stored indication by accessing, from the memory, a recorded version of the audio from the conference at the point referenced by the stored indication, providing the recorded version of the audio from the conference from the point referenced by the stored indication for playback at an accelerated rate, and providing the audio from the conference to the first conference participant in real time when playback of the recorded version terminates. The recorded version of the audio from the conference may be stored as a plurality of audio clips in a playlist, each audio clip including an utterance by one of a plurality of conference participants. The processor may be configured to provide the recorded version of the audio from the conference for playback by providing the plurality of audio clips for sequential playback from the point referenced by the stored indication. The recorded version of the audio from the conference may be stored as a plurality of audio clips in a playlist, each audio clip including an utterance by one of a plurality of conference participants. The processor may be configured to provide the recorded version of the audio from the conference for playback by providing the plurality of audio clips for playback in the same manner in which they were recorded from the point referenced by the stored indication, where two or more of the plurality of audio clips are played in an overlapping manner when the corresponding audio from the conference included overlapping utterances from multiple conference participants. In some embodiments, the processor is further configured to receive user input of data to associate with the stored audio clip in the playlist, and store the data with an association to the stored audio clip. The stored data may comprise at least one of a subject, description, transcription, keyword, flag, digital file, and uniform resource locator.

One aspect relates to a non-transitory computer-readable medium comprising computer-readable instructions encoded thereon for processing audio content of a conference. The computer-readable instructions comprise instructions for providing audio from the conference to a first conference participant, detecting a start of an utterance by the first conference participant, and in response to detecting the start of the utterance, stopping the provision of the audio from the conference to the first conference participant. The computer-readable instructions further comprise instructions for storing an indication of a point in the audio from the conference at which the provision of the audio from the conference to the first conference participant was stopped, detecting an end of the utterance by the first conference participant, and in response to detecting the end of the utterance, resuming the provision of the audio from the conference to the first conference participant at the point referenced by the stored indication.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 2 is an example display that is shown to a user for joining a conference, in accordance with an implementation of the disclosure.

FIGS. 3A and 3B show an example display that allows a user to access and play audio clips, conferences, a playlist, or subdivisions of a playlist, in accordance with an implementation of the disclosure.

FIGS. 4 and 5 are example displays of a notifications dialog, in accordance with an implementation of the disclosure.

FIG. 6 is an example display of a prompt for a user to modify playback settings, in accordance with an implementation of the disclosure.

FIG. 7 is an example display of an interface for filtering audio clips, in accordance with an implementation of the disclosure.

FIG. 13 is an example display of a roster, in accordance with an implementation of the disclosure.

DETAILED DESCRIPTION

Figure 1:
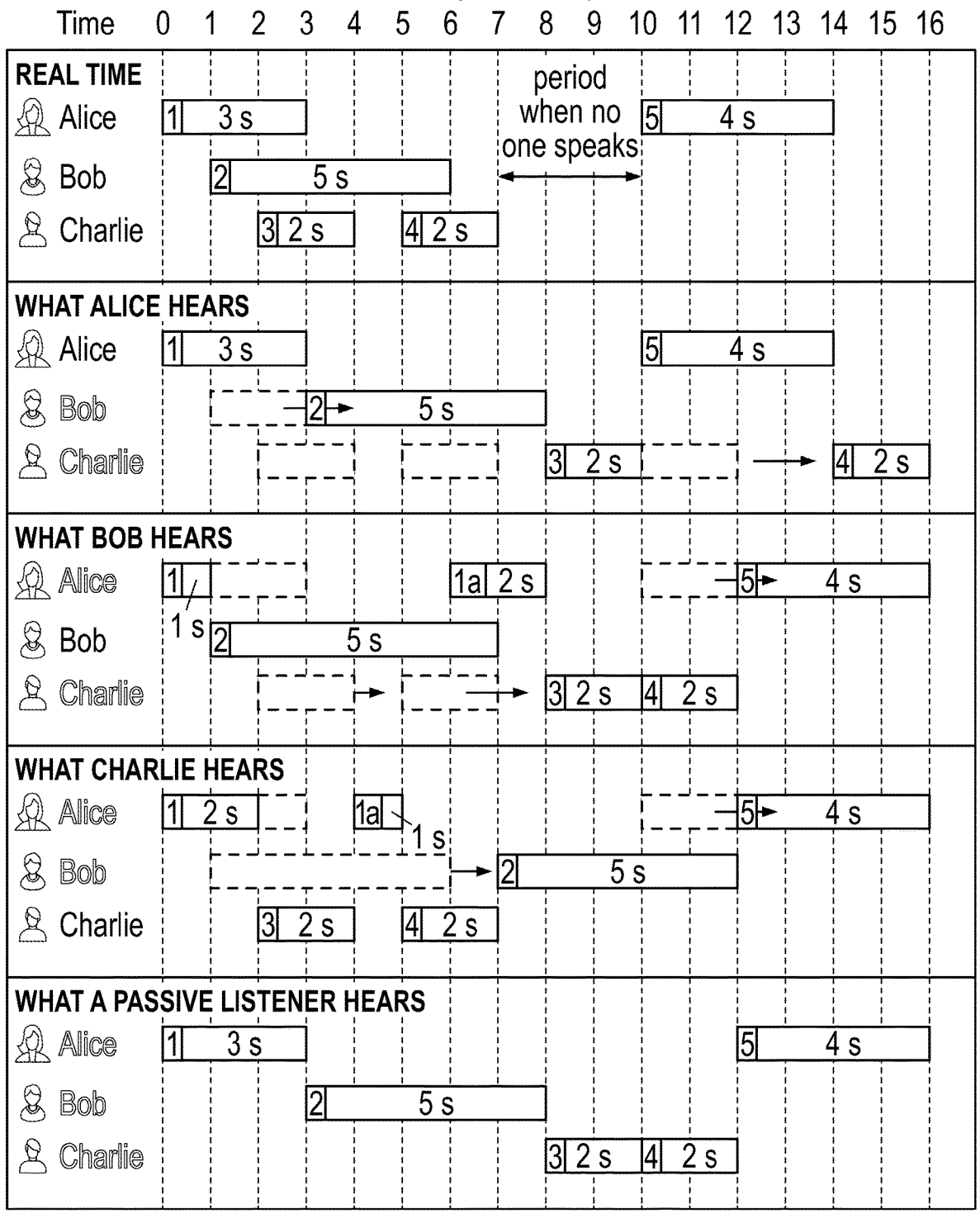
FIG. 1 is an example diagram of various timelines during a conference in voicechat mode, in accordance with an implementation of the disclosure.

To provide an overall understanding of the invention, certain illustrative embodiments will now be described, including a system for providing various services to an audio conference. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope of the present disclosure. Moreover, one of ordinary skill in the art will understand that other embodiments may be used to implement the systems and methods described herein.

Systems and methods for improving video and audio conferencing services are provided. Specifically, techniques are described herein for processing the audio content of conferences in a manner advantageous to real-time or future playback. These techniques may, for example, reduce the deleterious effects of multiple conference participants speaking at the same time. The techniques described herein also enable users to access audio content of conferences in a variety of useful ways. For instance, audio content from one or more conferences may be stored in a playlist as "clips" and delineated by speaker, topic, and/or other criteria. Tools may be provided for accessing, modifying, and/or augmenting the clips in the playlist. For example, users may be provided with search and sort tools, and may be able to tag or otherwise associate data with the audio clips. Users may also be provided with tools for efficiently playing audio clips in the playlist, e.g., using various filtering and playback settings. In some configurations, users may be able to add new audio clips to the playlist, which may be linked to existing clips and conferences in a number of ways. As used herein, a "clip" may refer to a single audio file corresponding to a single utterance spoken by a user. Alternatively, a "clip" may refer to a portion of a longer audio file that includes multiple utterances spoken by one or more users. In this case, the clip refers to the portion of the longer audio file that corresponds to a single utterance, and index points may be used to indicate the beginning and end of the clip within the longer audio file. Moreover, users participating in a conference often have external interruptions that are distracting. In this case, the systems and methods of the present disclosure allow such users to pause the conference and return to the conference, picking up where they left off. In this manner, users may pause the conference, direct their full attention to the interruption, and return to the conference at the paused point so that upon return to the conference they may devote their full attention to the conference and catch up (with optional accelerated playback) to the other participants without missing any portion of the conference. Moreover, the present disclosure provides systems and methods for the conference to continue even after all participants have disconnected from the live conference. In particular, the audio and/or video signals recorded during the conference are saved, and users may return to play the signals and record new content to continue the conversation.

Recording Audio Clips

In an embodiment, as individuals speak during a conference, audio is recorded for each individual and the sound levels monitored to determine the start and end of each utterance. These utterances may be indexed and/or used to create clips that are added to a playlist for subsequent playback. The clips may then be replayed naturally in a selected mode. For example, a first mode may correspond to a "conference mode," in which the audio clips are mixed and voices overlap in a reenactment of the actual conference. The "conference mode" may be referred to as a "natural mode" because the reenactment of the actual conference is similar to playing the conference in real time. A second mode may correspond to a "voicechat mode," in which the clips are played sequentially one-by-one in the order of their start times. The "voicechat mode" may be referred to as a "sequential mode" because the clips are played sequentially. A third mode may correspond to an "interleaved sequential mode," in which the clips are played in the sequence of their start time with earlier starting clips being paused during playing of the later overlapping clips. The "interleaved sequential mode" may be referred to as the "threaded mode," in which clips corresponding to the same topic or conversational thread may be played sequentially, even if intervening clips corresponding to different topics or conversations were recorded in between the clips.

In some implementations, one of these three modes may be set as a default mode, and a user wishing to transition to a different mode may select different mode buttons on the interface. In an example, the voicechat mode may be the default mode, and the user may select a conference mode button to transition to the conference mode, or an interleaved sequential mode button to transition to the interleaved sequential mode. Moreover, a user's last used mode may be remembered, such that if the user logs out of the system or otherwise closes the interface, the system may apply the last used mode the next time the user logs in. Such settings may be associated with the user's account, such that the system may remember the user's preferences across different devices.

FIG. 1 is an example diagram of various timelines during a conference in voicechat mode. As shown in FIG. 1, there are at least three participants Alice, Bob, and Charlie in the conference. The diagram includes five rows corresponding to real time (top row), what Alice hears (second row), what Bob hears (third row), what Charlie hears (fourth row), and what a passive listener hears (bottom row). In real time, the conference participants interrupt one another, and their utterances overlap. In particular, Bob begins speaking at time t=1, during Alice's first utterance. Charlie begins speaking at time t=2, also during Alice's first utterance and during Bob's first utterance. Nobody speaks while t=7 to 10, and Alice speaks her second utterance from t=10 to 14.

In voicechat mode, the clips are played sequentially in the order of their start times. In the second row of FIG. 1, even though Bob begins speaking at time t=1, Alice does not hear his utterance until she is done speaking her first utterance at time t=3. Moreover, Alice does not hear Charlie's utterance that actually began at time t=2 until time t=8 after she has heard Bob's complete utterance. Alice selects to speak her second utterance starting at time t=10, such that Charlie's second utterance that actually began at time t=5 is not played to Alice until her second utterance is complete at time t=14.

According to the third row of FIG. 1, Bob interrupts Alice at time t=1, such that Bob does not hear the last two seconds of Alice's first utterance until Bob is done speaking his first utterance at time t=6. Immediately after Bob is done listening to Alice's first utterance, Charlie's two utterances are played back-to-back, followed by Alice's second utterance. According to the fourth row of FIG. 1, Charlie interrupts Alice's first utterance beginning at time t=2, and does not hear the rest of Alice's first utterance until Charlie's first utterance is complete at time t=4. According to the bottom row of FIG. 1, a passive listener listening to the conference simply hears the clips played sequentially in the order of their start times. In particular, Alice's first utterance is played first, followed by Bob's utterance, Charlie's two utterances, and Alice's second utterance. As is shown in FIG. 1, all participants are caught up to the same point in the conference at the same time (i.e., shown as time t=16 in FIG. 1). In particular, because all participants are either listening to or speaking the same utterances, but perhaps broken up in different ways, all participants may return to the same live point in the conference after listening to the same content. In this manner, the systems and methods of the present disclosure allow conference participants to hear every utterance without interference from overlapping speakers and without being interrupted, while maintaining a consistent schedule such that the participants are all roughly at the same point in the conference.

In some implementations of the present disclosure, the audio data are stored as a separate audio clip file for each utterance. In particular, each audio clip may correspond to a single utterance spoken by a single user. In this case, a single user may be associated with multiple audio clip files, and the audio clip files may be tagged according to subject threads. Alternatively, the audio data may be stored in a single continuous audio file, and index points may refer to timestamps of the continuous audio file indicative of when a speaker begins and stops speaking. In this case, different continuous audio files may be stored for each user or speaker, and the timestamp indexes may be saved as metadata associated with the audio files. The indexes may also be used to follow a subject thread. In particular, a separate file may be used to store the various indexes indicating start and end times of utterances regarding the same subject thread. In this manner, index points indicative of time offsets and duration may be used to break up long audio files, rather than storing separate audio clip files for each utterance. As used herein, a clip, an audio clip, or an audio clip file may refer to an individual audio file storing the utterance, or may refer to a portion of a longer audio file storing multiple utterances, where the portion containing the utterance is indicated by one or more index points.

In an embodiment, while a user speaks during a conference, the audio output from the conference is paused for a user when the user begins to speak, and an audio clip is recorded for each individual who is speaking at the same time, including the user. When the user finishes speaking, the audio clips may be played back to him in conference mode, voicechat mode, or interleaved sequential mode. Optionally, the audio clip corresponding to the user may be omitted during playback. In some embodiments, the playback is accelerated so that the user may catch up to the real-time conference.

Normal Use of Mute on Conference Calls

Often on a conference call participants will mute their microphone on their phone or computer by which they connect to the conference to prevent unwanted background noise or interruptions such as a cell phone call from interfering with the call. When they wish to speak on the conference they unmute the microphone. When they stop speaking, participants often mute the microphone again, so that others on the conference are not disturbed by background noise from their environment.

Use of Mute to Switch Between Live Audio and Playback

These mute and unmute events can be detected and used to stop the conference call's live audio and start the recorded playback. For instance, when a first speaker unmutes to speak, the live audio may be stopped so that other speakers do not distract the first speaker. Then, when that speaker finishes speaking and mutes again, the recording of any other utterances is played back to the speaker. A user may select to link (1) a selection of the unmute button to a pause of the audio, and (2) a selection of the mute button to a play of the audio.

Alternatively, play and pause buttons may be used to implicitly signal mute and unmute, respectively. In particular, when the user selects to play the audio, the user may be automatically muted, and when the user selects to pause the audio, the user may be automatically unmuted. This may be referred to as a play/pause feature, which may be used during a live conference. In particular, the user may select a pause button to switch mute off, such that the user may speak in an uninterrupted fashion while the audio is paused. Moreover, the user may select a play button to switch mute on, so that the user may listen to the conference. In another example, mute, unmute, pause, and play buttons may all be explicitly provided so that the user may have the flexibility to configure the user settings.

Optionally, the playback is performed at an accelerated speed until the first speaker is caught up to the real time conference. When the speaker is caught up, the playback is stopped, and live audio is resumed. Alternatively, the user may select to skip the playback and immediately join the live conference without listening to the playback. In some embodiments, if the first speaker does not use the mute control, the detection of speech and cessation of speech can be used as automated triggers to achieve the same effect as unmute and mute. Detection of the cessation of speech may involve detecting that an amount of sound level recorded at the speaker's microphone is below a threshold level for a certain period of time. Moreover, a small amount of buffer time may be used after the detection of the cessation of speech but before the end of the clip to ensure that the utterance has ended.

Conference

As used herein, the term "conference" should be understood to encompass an audio or a video conference (or other multimedia conference) having an audio component. Conference participants may participate in a conference in real time, or different users may participate in the conference at different times. In particular, a conference may include a live conversation that is recorded and capable of being listened or watched at a later time, audio or video content that may be recorded by one user that is not connected to a live conference, or a combination thereof. In particular, a conference may include a live portion, during which users are connected over the same line and may interact with one another. The live portion may be capable of being played to a participant or a non-participant of the live conference, who may then record a response to some content discussed during the live portion. Such a recording may be referred to as an offline portion of the conference. In an embodiment, multiple participants may access a conference using a wide-range of devices and/or applications, such as land phones, mobile phones, tablets, computers, or any suitable device for accessing a conference. For example, one participant may use a phone to dial-in to a conference, while another joins the conference using an Internet service that he accesses using a personal computer. In some implementations, the present disclosure relates to interactive web collaboration systems and methods, which are described in U.S. Pat. No. 7,571,212, entitled "Interactive web collaboration systems and methods," which is incorporated herein by reference in its entirety. In some implementations, the present disclosure uses systems and methods similar to a musical application for creating and editing a musical enhancement file to process audio data collected during a conference. Such a musical application is described in U.S. Pat. No. 7,423,214, entitled "Systems and methods for creation and playback performance," which is incorporated herein by reference in its entirety.

FIG. 2 shows two example displays that may be shown to a user for joining a conference. In particular, the left hand side of FIG. 2 provides an example screen for the user to enter the user's call id for entering the conference system, and optionally the call id of one or more other users for inviting to enter the conference system. In some embodiments, the conference may be initiated from a web page set up for a particular conference id. Alternatively, the user may enter a conference id indicative of a particular conference that the user wishes to join (not shown in FIG. 2). The right hand side of FIG. 2 allows the user to set various conference settings, such as mute, headset, volume, and gain. Regardless of the means used to access the conference, the sound recording from each participant may be stored as individual audio clips and associated with data. This data may include metadata that identifies the particular conference, the speaker, the time and date, the subject of the conference, the duration of the clip, any assets shown during the conference, such as a presentation or a view of a screen, and/or any other suitable information. The audio clips may be stored together with the data or metadata and added to a playlist accessible by users, who may be the participants of the conference or non-participants of the conference.

Playlist

Figure 3A:
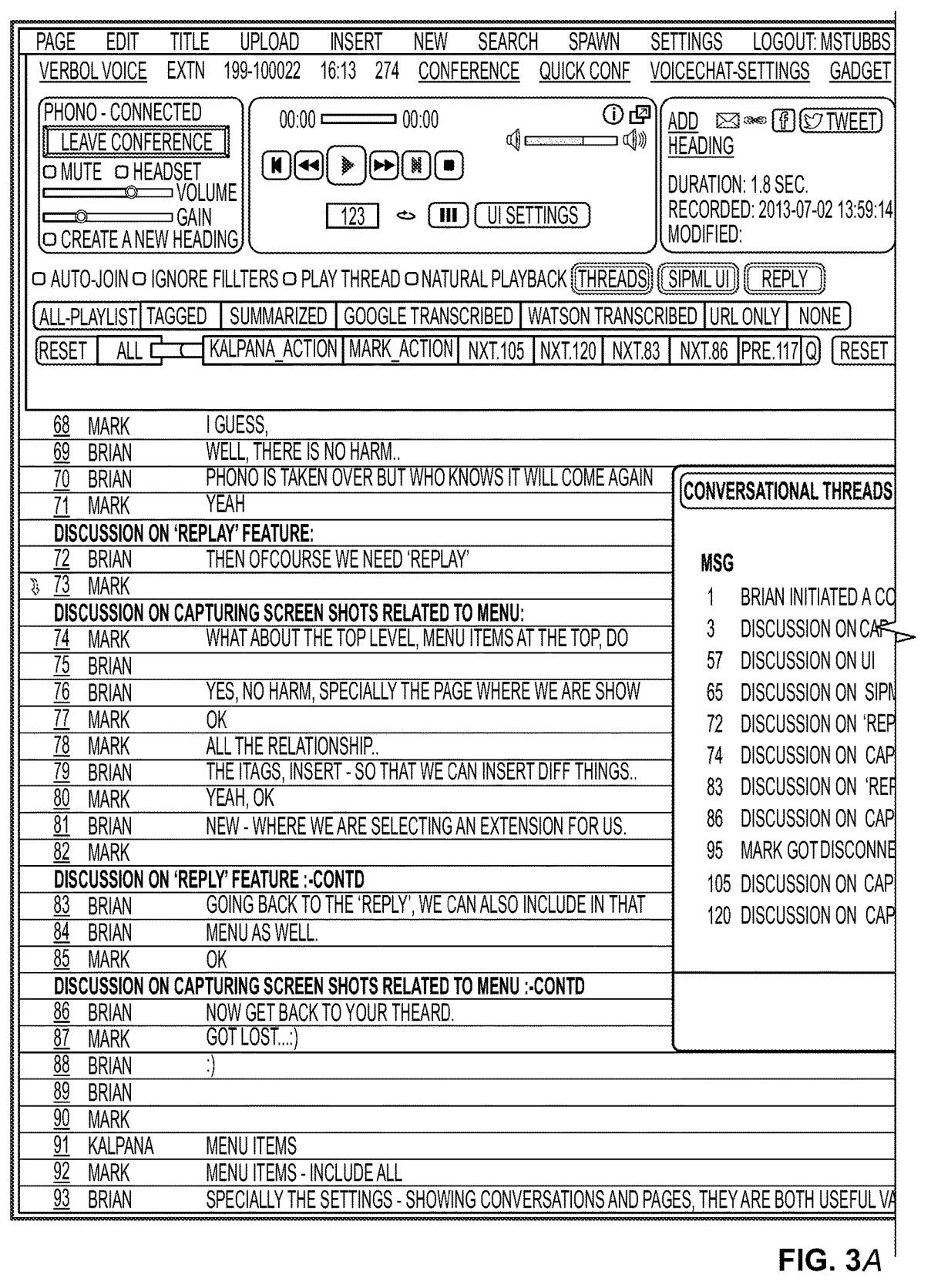
Figure 3B:
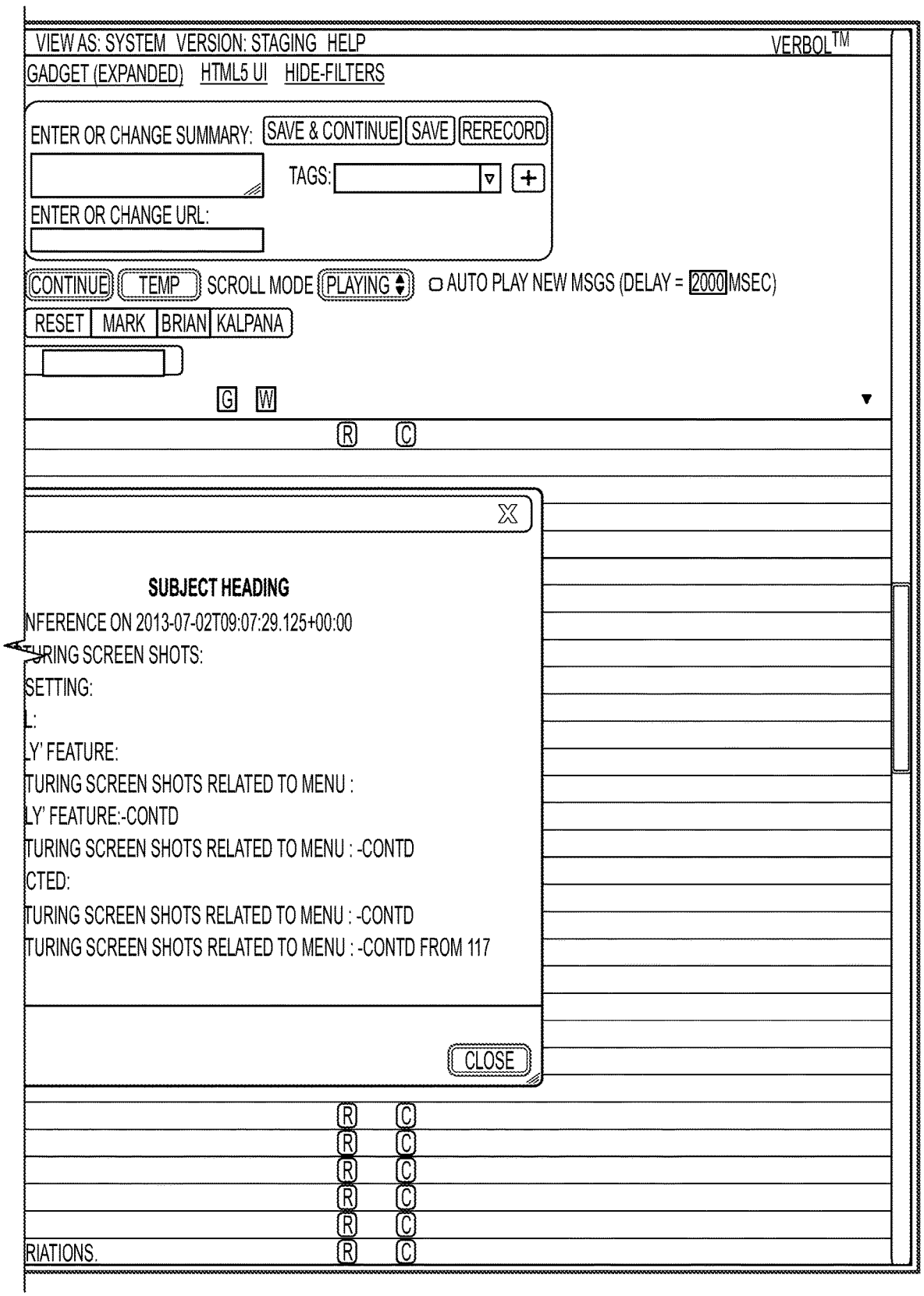

When a user accesses a playlist, the user may be presented with a display screen, such as the exemplary display shown in FIGS. 3A and 3B. The display in FIGS. 3A and 3B allows the user to access and play individual audio clips, whole conferences, the entire playlist, or subdivisions thereof such as individual subject threads. In particular, the display in FIGS. 3A and 3B includes a foreground section labeled "Conversational threads," which lists the various subject headings associated with different tracks, and the message number ("Msg") associated with the beginning of each corresponding track. The background of the display of FIGS. 3A and 3B includes an expanded list of the various tracks listed in the foreground "Conversation threads" section, including a list of all messages in each track, the participant who spoke the corresponding utterance, and the text of the utterance.

The user may select to play clips individually or in sequence. After listening to a selected clip, the user may select record a new audio clip to "reply" to the clip or to "continue" the conversation. The new audio clip may be recorded in real-time, automatically linked to the originally selected clip, and/or added to the playlist. Upon future playback, the new clip may optionally be played immediately after the originally selected clip. Although the new clip may be demarcated as having been recorded after the original conference took place (e.g., using a visual or audio indicator), this process enables the clip to be played back as if it were spoken during the conference.

In some configurations, a user can select to play a "thread," which is limited to the selected clip and any replies to a subject indicated by a heading and continuation headings as the conversation moves back and forth over various subjects. In particular, users may select to record utterances into one of a number of 'tracks'. In some embodiments, tracks may be associated with individual participants, individual topics, or a combination of both. Some playback modes may play each utterance based on its start time, regardless of its track, while other playback modes may allow a user to select to listen to one or more tracks simultaneously, or play all the utterances in one track followed by all those in the next track. In some embodiments, threads may be implemented using tracks. For example, upon being recorded, an utterance may be assigned to a track automatically, such as the track of the previous utterance that was recorded. The user may select to update the default track to a different track or a new track. After the utterance is recorded, headings or tags may be added to the audio clip to add the clip to one or more suitable threads. In an example, a listener may wish to play the thread related to the "Reply feature" listed in the "Conversational threads" dialog box shown in FIGS. 3A and 3B. In this case, the listener may select the heading of the "Discussion on 'Reply' feature" thread, and the utterances tagged with the appropriate thread are played. In particular, the utterances labeled 72, 73, 83, 84, and 85 are played in sequence, and utterances 74-82 are skipped because these utterances are related to a different thread.

Continuing a Conversation

When a user requests to "continue" a conversation, the user records a new audio clip or multiple clips in real-time and that audio clip is automatically added to the playlist and linked to the same discussion topic as the selected clip. This process enables multiple users to have continuous yet asynchronous verbal discussions. For example, a first and second user may participate in a conference on a Monday and the audio from that conference may be stored in the playlist under a heading indicating the conference date and/or topic. A third user may then play the conference the following Tuesday and select to "continue" the discussion. This feature allows the third user to record a one or more audio clip and to link it to the original conference in the playlist, e.g., so that it appears under the same heading or is otherwise labeled as to indicate its association with a subject thread in the original conference. The other conference participants may be alerted to the fact that the third user added a new clip to the conversation and may play the new clip. In some implementations, utterances labeled with "continue" or "reply" may be automatically recorded to different tracks to distinguish such utterances from utterances belonging to the main thread.

These other participants, e.g., the first user, may in turn "reply" to that clip or "continue" the conversation in the same manner. Thus, a continuous verbal discussion, including conferences between multiple participants and individual contributions, and which allows for asynchronous communication, may be maintained.

Figure 5:
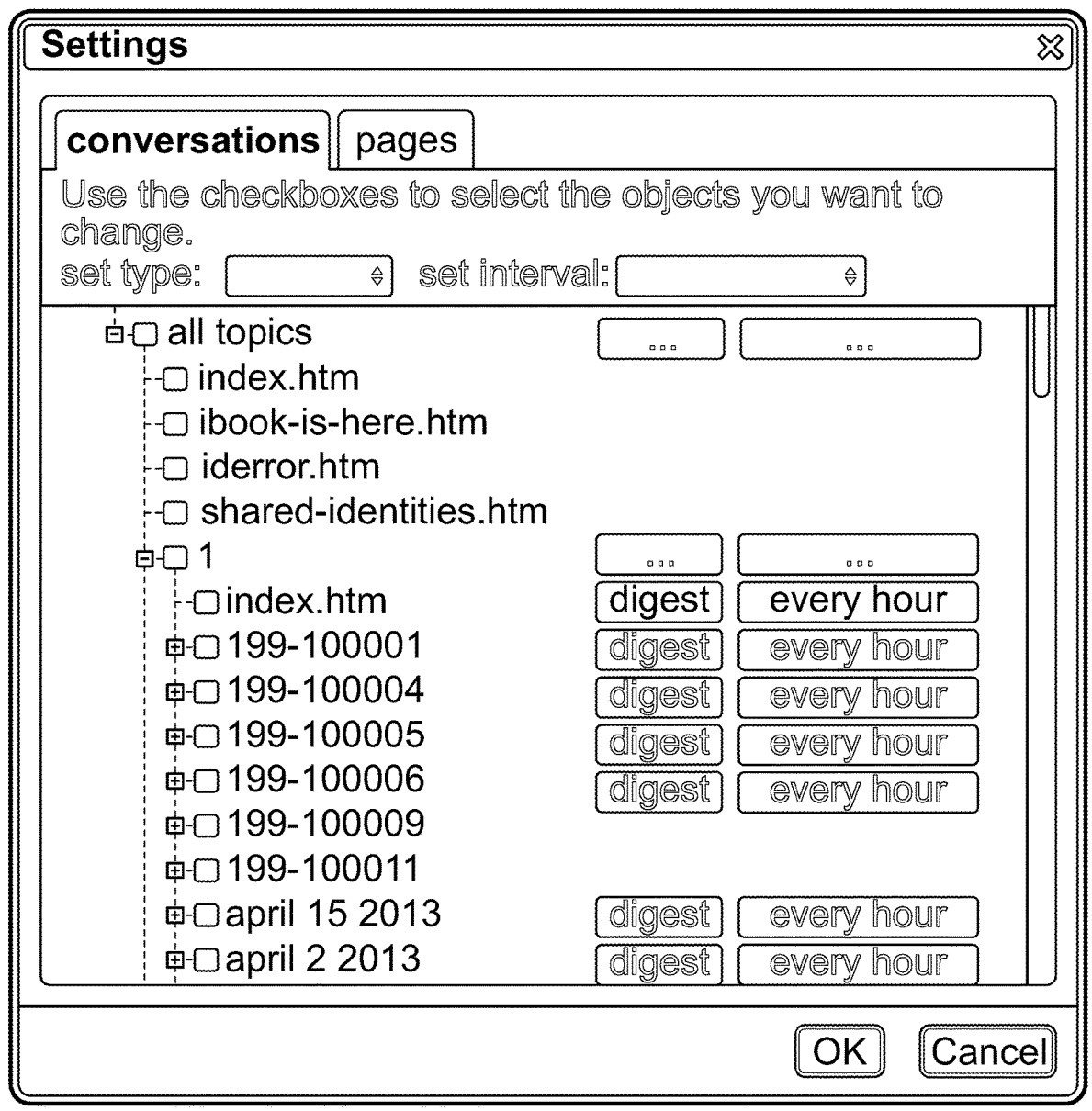

FIGS. 4 and 5 show example displays of a notifications dialog, in accordance with an implementation of the present disclosure. The display in FIG. 4 shows the data sorted according to conversations, while the display in FIG. 5 shows the data sorted according to pages. As is shown in FIG. 4, the owners of various extensions are listed in the display, and the user may select to modify a type and an interval for each corresponding owner and extension. In the example shown in FIG. 4, each extension corresponds to an owner id (i.e., the first three digits of the extension), followed by a conversation id (i.e., the last 6 digits of the extension). Each owner of an extension may select to receive notifications when an update to the conversation is made, or at fixed time intervals indicated by the interval. The type field shown in FIG. 4 refers to a type of notification. In an example, the digest type of notification may correspond to a summary of all the changes that have occurred in the conversation since the last notification was sent. Examples of changes include identifiers of users who made what changes and when such changes were made. Alternatively, another type of notification is a "link," for which the user receives a link to the changed entity within the conversation. Other types of notifications with different levels of detail may be used, and the users may select to receive notifications having different levels of detail for different conversations or extensions. Similarly, as is shown in FIG. 5, the user may select to modify a type and/or an interval for each extension.

Playback Settings

FIG. 6 shows an exemplary display of the system prompting the user to modify playback settings, according to an implementation of the present disclosure. In an embodiment, a user may modify a number of playback settings to control how audio clips are played in the playlist. Playback settings may be set globally or specifically for individual speakers. For example, a user may set a play speed, or tempo, for all speakers, or the user may set the tempo individually for each speaker. As is shown in FIG. 6, a user may enter the user's identifier, the user's nickname, the user's conference identifier, and the user's tempo, which may refer to the relative speed at which the user's audio is played.

Moreover, FIG. 6 includes options for the user to set settings specific to the speakers. Such settings include tempo, pitch shift, filter, silence, and volume. Selecting the silence setting causes silences to be removed during the playback of the clips. Selecting the filter setting causes the audio signals for the corresponding speaker to be filtered, to remove noise for example. Optionally, audio characteristics may be set and/or adjusted automatically. For example, the tempo of each speaker can be detected, such as by detecting an average syllabic frequency uttered by the speaker, and automatically adjusted to match a user-selected target tempo or an interval of elapsed time available for catch-up. For example, the syllabic frequency of a speaker may be detected and compared to threshold syllabic frequency. The threshold syllabic frequency may correspond to a fixed maximum syllabic frequency that is set for intelligibility, or may correspond to the syllabic frequency of the fastest speaker in the conference. The amount of speed-up applied to a speaker's utterance may be dependent on this comparison. In an example, the utterances spoken by slower speakers may be sped up at a higher rate than the utterances spoken by faster speakers, because the syllabic frequencies of slower speakers are further from the maximum syllabic frequency than the syllabic frequencies of the faster speakers. In this manner, utterances from different speakers may be individually adjusted (manually or automatically) in accordance with their tempos to ensure that the utterances are sped up for efficiency while still being intelligible.

Filters

FIG. 7 shows an exemplary display of an interface for filtering audio clips, according to an implementation of the present disclosure. In an embodiment, the user may configure various filters to control which audio clips in the playlist are played. Using one such filter, the user may select to play the audio clips of only a specific person or specific persons. For example, the user may select to play back all audio clips aside from those for which he is the speaker. Using another filter, the user may select to play back only audio clips associated with particular tags, keywords, or other data. Audio clips may be associated with tags, metadata, URLs, descriptions, priorities, external documents, etc. In some configurations, a user associates data with audio clips via manual data entry or by dragging and dropping the data onto a clip in the playlist.

Transcription

Figure 8:
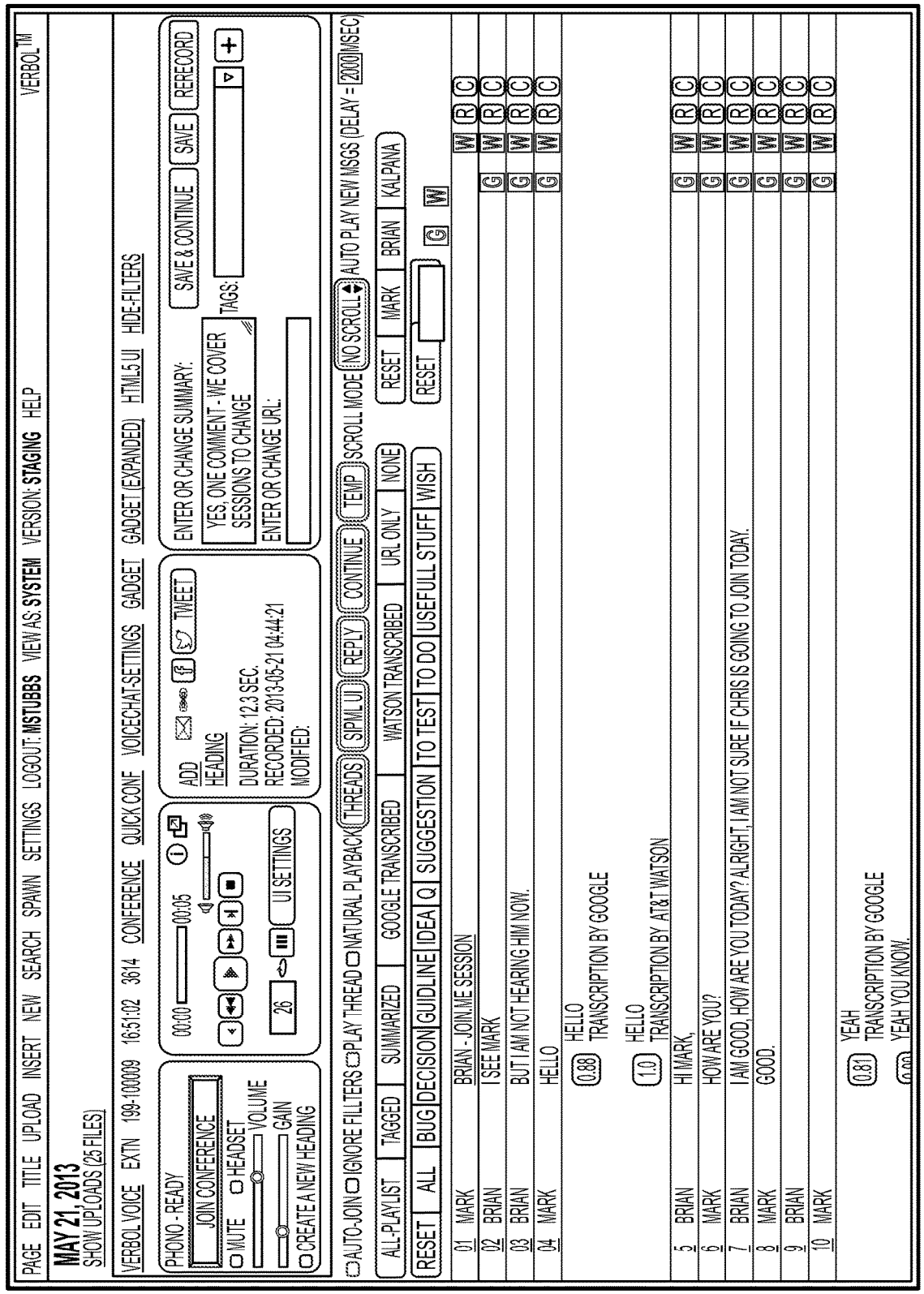
FIG. 8 is an example display of transcriptions associated with audio clips, in accordance with an implementation of the disclosure.

FIG. 8 shows an exemplary display of transcriptions associated with audio clips, according to an implementation of the present disclosure. Audio clips may be transcribed, and the transcription of the audio content may be made available via the playlist. The transcription may be manual, automatic, or a combination of both. For example, a user may select a clip, request automatic transcription, and then manually edit the results. It is contemplated that automatic transcription may be provided by outside services, e.g., Internet-based services.

The audio clip may be automatically transmitted to the Internet service and the resulting transcription automatically retrieved and stored with the clip. Users of such services may correct transcriptions, and the corrections may be transmitted back to the service so that the service may improve its accuracy. By providing information concerning the speaker for each clip, the subject thread in which he is speaking, and the vocabulary associated with that thread, the service can improve still further in accuracy. The effect of all these improvements together should enable automatic transcription to be utilized for provision of highly accurate text. The text may be used for communication, authoring of programming and user scripting languages, translation between natural languages, and targeted advertising, for example.

Cooperative Browsing

In an embodiment, participants in a conference may engage in cooperative browsing. In this case, a participant shares a data object (e.g., a document, audio clip, video, URL, etc.), and the data object (or a reference to the data object such as a hyperlink) is automatically transmitted to each participant and displayed in real-time. In an example, the data object may involve a video stream of the participant's computer screen, so that the other participants may view the participant's screen during the conference. These data objects may also be stored and linked to particular audio clips in the playlist (and/or to particular index points within the audio clips). Upon playback, the objects may be redisplayed at the appropriate time just as in the live conference. In some implementations, shared assets related to a conference may be presented to a user as a synchronized slideshow during playback. Alternatively, such assets may be viewed as a collection of resources in a separate window.

Playback Modes

As discussed above, when a conference participant begins speaking during a conference, the conference audio may be paused for that participant so as to not interfere with his or her speaking. The conference audio may be accumulated and stored in the interim, e.g., as audio clips are added to the playlist. When the participant stops speaking, the stored audio content is subsequently played to the participant, so that the participant can listen to what the other participants said while he or she was speaking. The clips can then be replayed in "conference mode" in which the audio clips are mixed and voices overlap as they did in the actual conference, in sequential "voicechat mode" in which the clips are played one by one, or in "interleaved sequential mode" in which the clips are played one by one starting at the time relative to each other as they occurred with earlier starting clips paused during the playback of later starting clips. In the interleaved sequential mode, the clips that are played sequentially may correspond to a single thread, subject, or conversation. In particular, a reply clip that includes a reply to an original clip may be played immediately after the original clip in the interleaved sequential mode, even if intervening clips were recorded between the times that the original clip and the reply clip were recorded. In any such mode, the user may choose to accelerate playback so that he catches up to the live conference. In some configurations, the rate of acceleration may be automatically determined based on the elapsed time since the audio conference was stopped.

Reply

Figure 9:
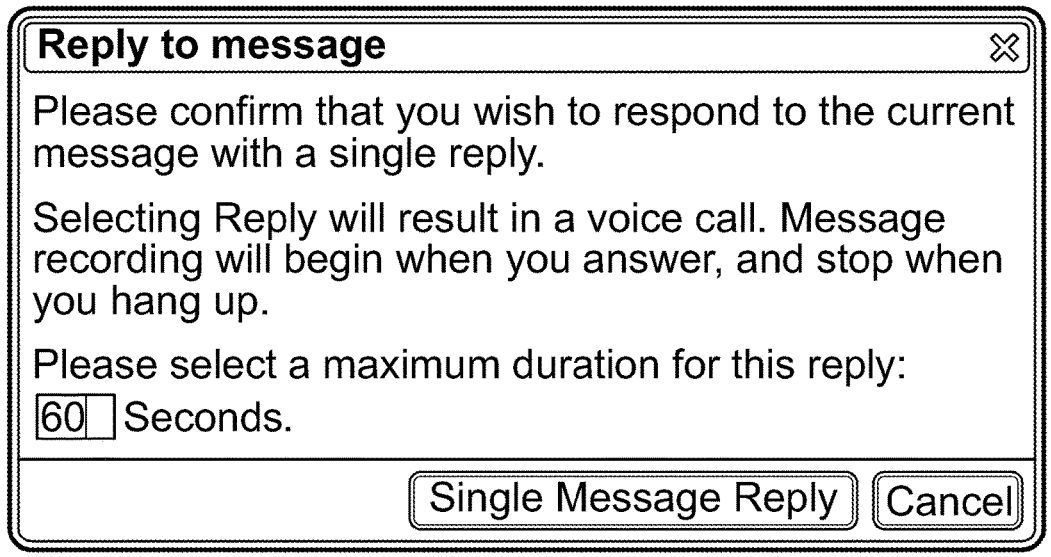
FIG. 9 is an example display of a message displayed to a user to confirm the user wishes to reply to an audio clip, in accordance with an implementation of the disclosure.
Figure 10:
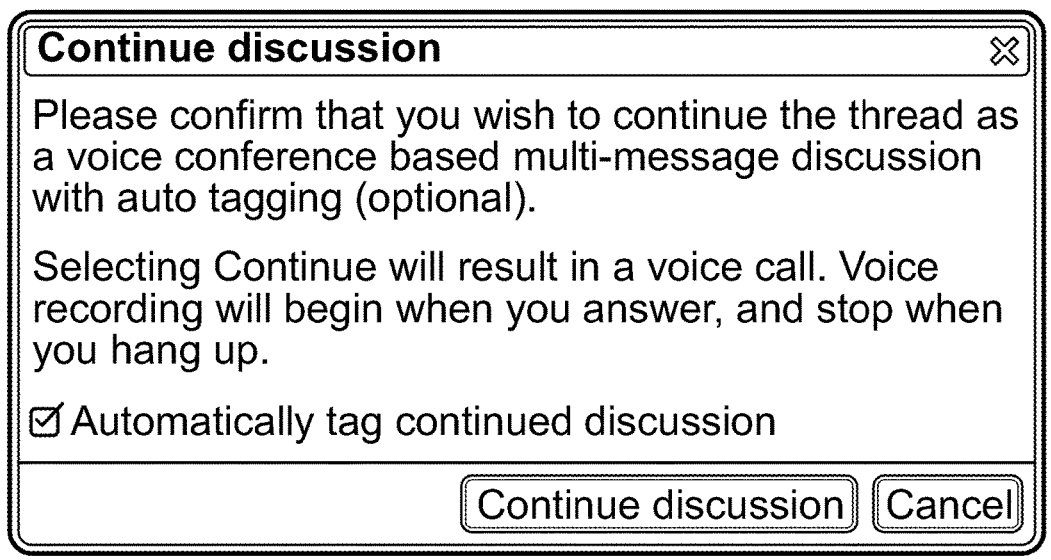
FIG. 10 is an example display of a message displayed to a user to confirm the user wishes to continue a conversation, in accordance with an implementation of the disclosure.

A similar feature may be provided when a user is playing back a stored conference, e.g., using the playlist. If a user chooses to "reply" to a particular clip or "continue" a conversation, playback may be paused while the user records a new audio clip. Subsequently, playback may resume at a normal or accelerated rate. FIG. 9 shows an exemplary display of a message displayed to a user to confirm that the user wishes to reply to an audio clip. As shown in FIG. 9, the user may provide a maximum duration for the reply. Selecting to reply to an original audio clip may cause the next recorded utterance to be associated with the original audio clip. FIG. 10 shows an exemplary display of a message displayed to a user to confirm that the user wishes to continue a conversation by recording a new clip related to an existing clip or set of clips. As shown in FIG. 10, the new recording may be automatically tagged to reflect the tags of the thread. Selecting to continuing a conversation may cause the next recorded utterance to be tagged with the associated tags of the thread or conversation. In some implementations, utterances labeled with "continue" or "reply" may be automatically recorded to different tracks to distinguish such utterances from utterances belonging to the main thread.

Autojoin

Figure 11:
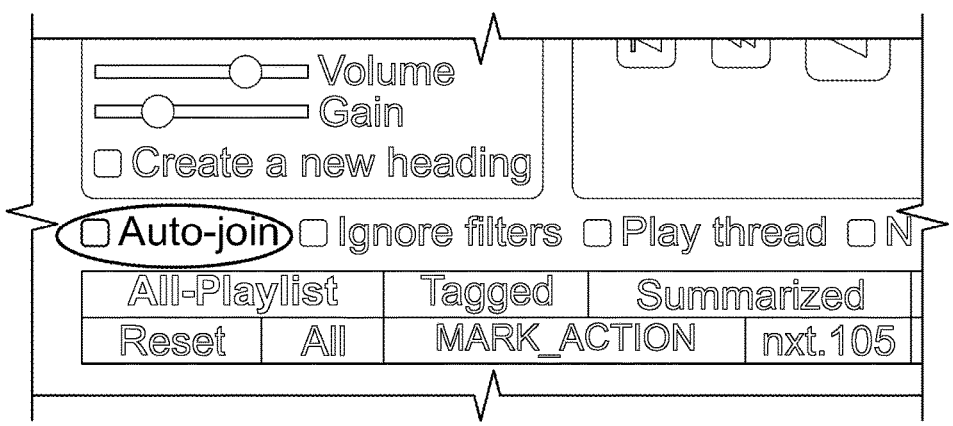
FIG. 11 is an example display of an option to auto join a conference, in accordance with an implementation of the disclosure.

FIG. 11 shows an exemplary display of an option to auto join a conference, in accordance with an implementation of the present disclosure. In particular, a user may select the option such that when he reaches the end of the playlist, he will be automatically added to the live conference and join with others already there and/or invite others to join him.

Detecting Clips

To store audio clips from each speaker, the sound level being transmitted from each participant's device may be monitored. In an embodiment, when the sound level surpasses a predefined threshold, recording may commence or an index point to a continuous recording is noted. As used herein, an individual clip may refer to the interval in a continuous recording between successive index points. When the sound level subsequently decreases below the same or a different threshold value, recording may stop, or another index point may be generated. Recording of the same clip or a different clip may resume if the sound level returns above a resume threshold within a defined period of time. The resume threshold may be the same or different from the predefined threshold that was originally used at the start of a clip. The thresholds may be different based on speakers or other variables such as background noise. In some embodiments, in order to optimize the size of the clip for transcription, translation or other purposes, the sound level threshold may be adjusted progressively as the clip is recorded. Other factors, such as vocabulary and phrase determination, may also be used to determine useful clip boundaries. Alternatively, if the sound level does not return above the threshold within the defined period of time, the recording may be terminated, and the audio clip is stored. The audio clip may also be associated with data, such as information identifying the speaker, topic, subject thread, related messages and vocabularies and grammars used. Speaker information may be provided, for instance, within the data stream transmitted by each participant's device, or the conferencing service may track each user when they access the conference. In particular, such metadata may include the speaker and the duration of the audio clip.

Flowchart

Figure 12:
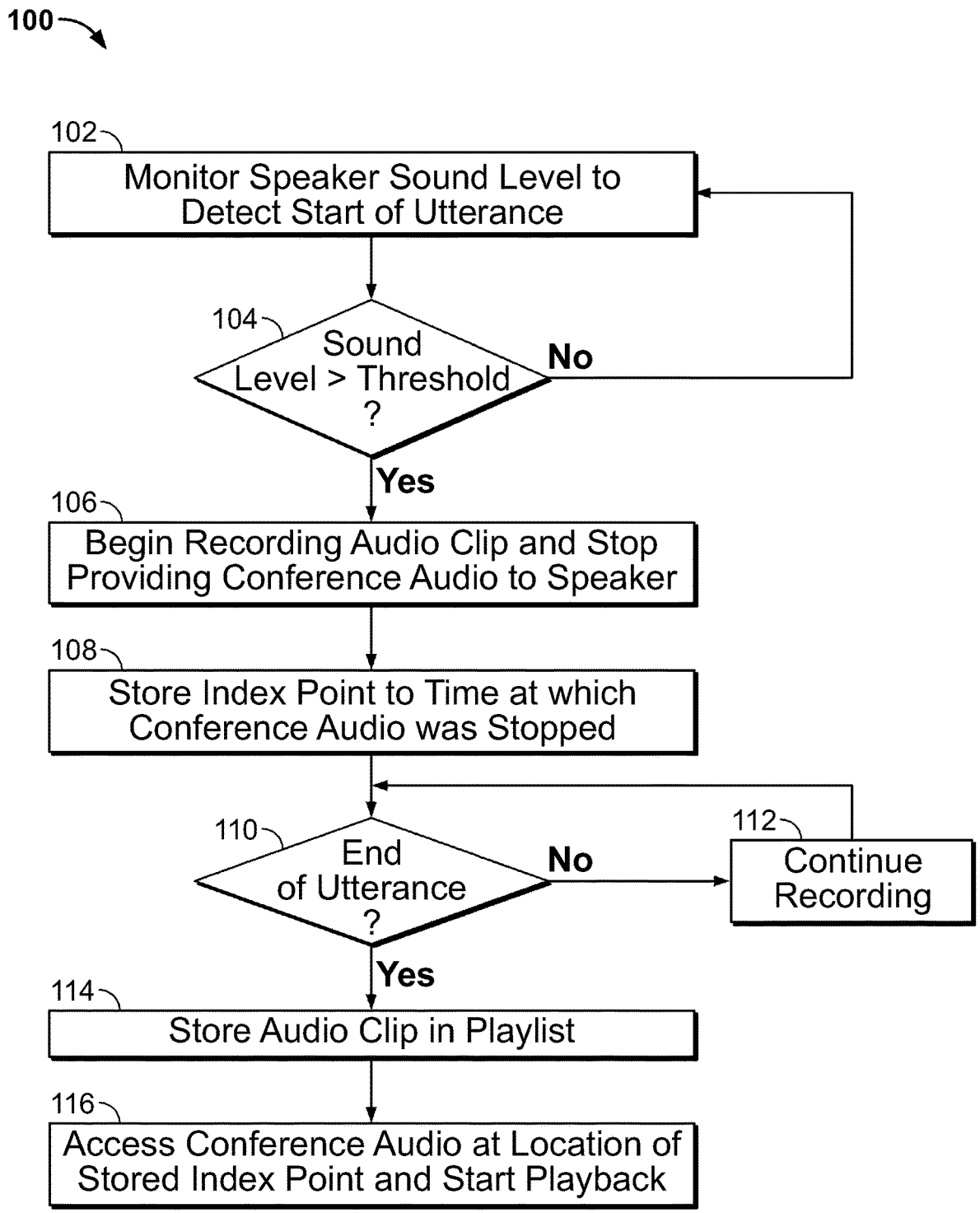
FIG. 12 is a flowchart of a process for conference enhancement, in accordance with an implementation of the disclosure.

FIG. 12 is a flowchart of a process 100 for conference enhancement, in accordance with an embodiment of the present invention. The steps of FIG. 12 may be performed by a process (which may be a software application, e.g., executed on a local device or a remote server). At step 102, the sound level of a participant on a conference is monitored. At step 104, it is determined whether the participant is speaking, i.e., whether the sound level emanating from the participant's audio stream (e.g., input by a microphone or other audio input device) is greater than a defined threshold value. If not, the process 100 returns to step 102 to continue monitoring the participant's sound level. Otherwise, the process 100 proceeds to step 106, where recording is initiated of the participant's audio stream as an audio clip. In addition, upon determining that the participant has begun speaking, or in response to the initiation of recording (e.g., a file write routine), the conference audio is paused such that conference audio is not provided to the participant. In this manner, the participant may speak without being interrupted by other speakers. In particular, a channel routine in the participant's out channel may detect that the participant is speaking by means of a signal or message from the in channel which is monitoring the speech, and stop sending the conference audio. In some embodiments, the audio signals recorded from the conference are processed after the conference is over. In particular, such processing may include detecting a speaker or metadata associated with the clips. In this case, the "in channel" may refer to the playback, or the original raw clips, and the "out channel" may refer to the output of the processing or analysis, such as the speaker information or metadata associated with the utterances. In some embodiments, pausing the conference audio is optional. In this case, the user may select whether the process 100 should automatically stop the conference audio upon detecting speech. Alternatively, the user may control the provision of the conference audio manually (e.g., by selecting a button).

Generally, the conference audio may be recorded from the beginning, e.g., as soon as the conference starts, and the audio may be stored as audio clips that are added to a playlist. In this scenario, the time reached in the conference when the audio is stopped is noted and stored, as reflected by step 108. For instance, an index point into the audio conference may be generated and stored. Alternatively, if the conference is not being recorded at the time it is stopped for the participant, it may be recorded at that point and stored until the user stops speaking. Optionally, a track, a subject thread, or both is initiated or continued from the point at which the conference is stopped and the participant commences speaking.

After initiating recording of the participant and stopping the conference audio, the process 100 proceeds to step 110, where it determines whether the participant has stopped speaking. As mentioned above, a user may be deemed to have stopped speaking when the sound level drops below a threshold for a particular duration of time. Alternatively, a user may manually indicate that he has stopped speaking. If the user has not yet stopped speaking, the process 100 proceeds to step 112 and continues to record the participant's utterances in the audio clip. The process 100 then loops between steps 110 and 112 until it is determined that the user has indeed stopped speaking.

After determining the user has stopped speaking, the process 100 proceeds to steps 114 and 116. The order of steps 114 and 116 is not significant, and either may be performed first or the steps may be performed in parallel. At step 114, the audio clip is stored in the playlist, where the clip may be tagged, annotated, and played, for example. At step 116, the previously stopped conference audio is accessed at the location indicated by the index points stored at step 108, and played back from that point. The conference may be played at a normal speed or at an accelerated pace, and the conference audio may be replayed in accordance with one of multiple modes. In conference mode, the audio is replayed as it was heard on the conference, with all audio streams from the various speakers mixed. In voicechat mode, the audio is replayed sequentially, with the audio streams of each speaker separated and played one after the other sequentially or interleaved in interleave sequential mode. After the participant has "caught up" to the live conference, the process may revert to transmitting the live conference audio.

The replaying of conference audio to the user can be by replaying the audio either sequentially or reenacting the conference as a mix from recordings of the clips by each other speaker as described earlier or from a recording of the audio mix as it would have been heard by that speaker by monitoring and recording the out-channel to each participant from the conference bridge as well as the in-channel (as there is a different mix for each participant with each mix leaving out that participant's voice). The clips may be analyzed in real time or after a conference to determine and save metadata associated with each clip. Such metadata may include the speaker of the clip or the duration of the clip. Alternatively a recording of the mix of all speakers may be used though in this case the user will hear his own speech played back to him.

Playback Speed

In an embodiment, the conference audio begins playing from the playlist at exactly the point indicated by the stored timing information. Alternatively, the conference audio may start replaying from a prior point, e.g., a user-adjustable time. The user may manually accelerate the conference audio or the user may request automatic acceleration (the latter may be a default setting). In addition, the user may control acceleration, i.e., set the speed at which the audio is replayed, or the process may determine the speed of acceleration automatically. In some configurations, the speed of acceleration may be determined from the elapsed time since the conference audio was stopped. For instance, if the participant spoke for 1 minute as did others in parallel and others continue to speak, and he desires to catch up to the live conference within 2 minutes the rate of acceleration may be calculated as 1.5×. There may, in some instances, be a maximum rate of acceleration for intelligibility. In some configurations, the rate of acceleration may be speaker-specific, e.g., to ensure intelligibility. For example, the process may automatically determine the tempo of each speaker and accelerate those tempos up by the same relative amount or to a global maximum tempo, or up to an average tempo necessary to enable the participant to catch up within a desired period of time.

Pausing and Catching Up to Live Audio

The playback may also be paused or slowed, manually or automatically, at certain events or time intervals to enable the participant to add tags or other annotations. For example, the playback may pause after the termination of each audio clip. These pauses may be taken into account when calculating the total acceleration necessary to catch up to the live conference. In an embodiment, the user is provided with a feature to save his place in the conference audio during playback, so that he can switch between the live conference and playback at his desire. In this manner, for example, the user can catch up on a missed portion of the conference during one or more breaks in the live conference.

Activity Info and Ping

During a conference, each participant may be provided with an indication of which other participants are actively listening to the live audio or are engaged in playback. Users may be able to "ping" or otherwise message the participants in playback mode to signal that their presence in live mode is requested. In some embodiments, in response to a ping request, the process may automatically save the playback participant's place in the conference playback and automatically connect him to the live conference.

Playback Tools and Switching Between Live and Playback

The playback mode features discussed above can be used advantageously in circumstances other than when a participant speaks. As discussed above, a user may replay a conference after the conference has terminated and access the features above, e.g., the tools enabling acceleration and/or sequential or normal playback. During playback, the user may select to omit clips from certain speakers, e.g., clips originating from the user himself. In some configurations, playback mode may be used during the live conference even when the participant is not speaking. Specifically, when several conference participants speak at once, a participant (or all participants) may be automatically switched to playback mode and clips of each speaker may be played sequentially. In an example, all participants may be switched to playback in voicechat mode, and the clips may be played such as is shown in FIG. 1. The playback, of course, can be at an accelerated rate, which may be configured on a speaker-by-speaker basis, as discussed above. Moreover, acceleration may be configured based on the accumulated backlog of audio clips. After listening to each clip (or skipping one or more of the clips), the participant may then be transitioned back to the live conference. The switching between playback mode and live mode may be seamless to the user, so that each participant experiences a pseudo-real-time conference free from individuals talking over one another.

Playback During Conference

Conference participants may also make use of playback mode electively, e.g., to recap something previously said, or in case the participant has to leave the conference for a period of time. In this scenario, the user can, during the live conference, access tools that allow the user to "pause," "rewind," or otherwise skip backwards in time, and then playback the conference as desired.

Playback Out of Conference

The action of playing back an earlier part of the conference may optionally cause the conference audio to stop and go into catch up mode when the playback is paused. Alternatively playback may continue until it reaches the live conference. This may be done while on mute so that the playback does not affect the ongoing conference and the playback may be accomplished independently of the conference connection by means described earlier. In some embodiments, the detection of speech causes the conference live audio to stop. In general, the playback may be sent by the system to the telephone or computer connected to the conference in place of the usual conference mix. Echo cancelling may be used to prevent the playback from being heard back in the conference.

Playback into Conference

Alternatively, the user may wish to play back into the conference for all the conference participants to hear. In this case, the user may unmute his microphone at the start of the portion he wishes to play back, share the play back, and mute his microphone after the play back. In embodiments wherein the mute button is unnecessary or not used, the system may switch off echo cancelling or otherwise cause selected recordings to play into the conference such as through a playback station connected as another user and controlled by any user through a web interface. Alternatively, the mute and unmute buttons may be implemented, and the audio is automatically paused when the unmute is selected and is automatically played when the mute is selected.

Roster

Participants may be informed of other participants' actions by displaying a roster of the participants. The roster may indicate presence information, such as indications of when a particular participant is speaking, or what portion of the conference one or more participants are listening to and at what speed. In some implementations, the roster may flag a significant change of speaker state (such as a participant joining or leaving a conference, for example) by displaying a popup notification on a user's desktop or browser.

Figure 13:
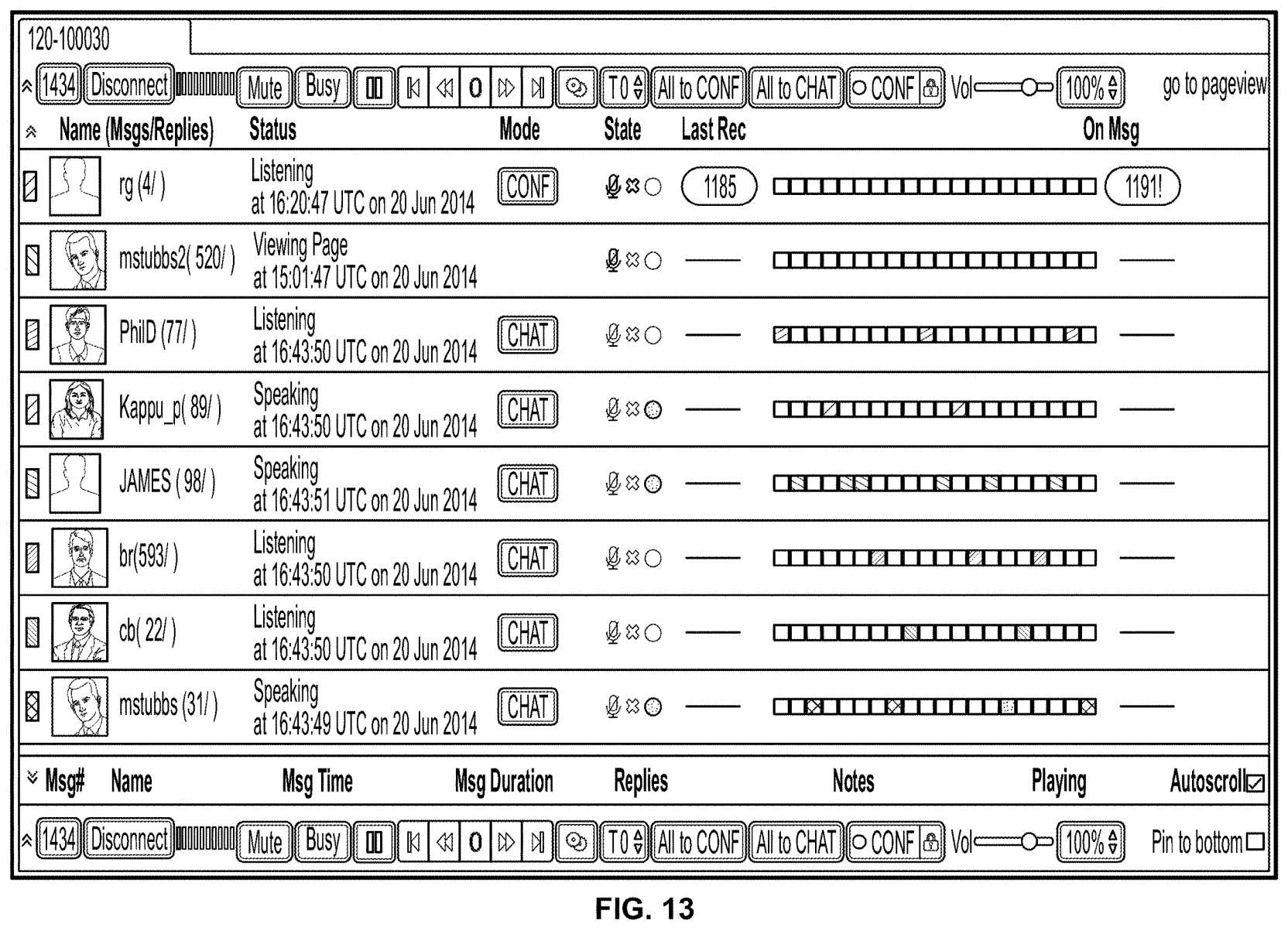

FIG. 13 is an exemplary display of a roster, in accordance with an implementation of the present disclosure. In particular, the roster shown in FIG. 13 includes a list of names of conference participants, as well as a status of each participant. The status indicates whether the corresponding participant is listening to the conference, speaking into the conference, or neither (i.e., viewing the page). In particular, if the participant is neither listening nor speaking to the conference, the participant may be viewing and/or editing a webpage associated with the conference. Such information of what the participant is viewing or editing may be displayed on the roster. Moreover, the roster includes a current mode (i.e., conference or chat mode) associated with each participant. The state of each participant indicates whether the participant is muted or recording his voice. Furthermore, the "Last Rec" section of the roster indicates the last recording created by each corresponding user, and the "On Msg" section of the roster indicates the current message or clip that is being listened to by the user. The roster shown in FIG. 13 may be updated in real time as the various participants change their modes and states. In an example, the roster shown in FIG. 13 may also include a user option to select whether to play his own utterances during playback.

Timeline by Speaker or Subject Thread

There may also be a timeline display of the conference, which displays the utterances of each speaker. The timeline display may indicate how the conversation shifts across different speakers and/or across various conversation threads. Different speakers and/or different threads may be indicated by different colors on segments of each thread line. In some implementations, the timeline display may provide a visual indicator referring to the track into which an utterance is recorded (such as a track number that is displayed for each utterance, for example). In some implementations, the timeline display may be shown in the roster as is described above. In the example view of the roster in FIG. 13, the timeline display includes a row of twenty rectangles corresponding to each participant. Each row of rectangles corresponds to the last twenty utterances spoken by all the participants in the conference, and a highlighted rectangle in a particular row means that the corresponding participant spoke that utterance. Different colors or textures, or any other suitable graphical indicia may be used highlight a rectangle. The example timeline in FIG. 13 is shown as an illustrative example only, and other features may be included in the timeline that are not shown in FIG. 13. For example, a user may interact with the timeline display to navigate an entire conference, conversation, or a portion thereof. In this case, the user may zoom into the timeline display to focus on one or more particular utterances, or may zoom out to see a roadmap of the conference. Furthermore, the width of each rectangle may be based on a duration of the utterance, such that wider rectangles correspond to longer utterances. Such timelines may be referred to as scaled timelines. In this case, it may be further desirable to provide an indication on the timeline of when silences and pauses occur. Indicating when silences and pauses occur may be desirable for tuning the process of detecting utterances. However, it may be undesirable to display very long silences on the timeline, which may instead of indicated using a graphical indicia such as an ellipsis or a line across the timeline.

Options when Speaking Starts

When one person starts speaking and his conference audio is paused, the other participants have the option of hearing his speech in the conference in the conference mode or in the voicechat mode. For example, all participants may be switched into voicechat mode as soon as the speaker starts speaking. In this case, all participants may listen to the speaker at normal speed such that the participants finish listening at the same time, as is described in more detail in relation to FIG. 1.

Option of Hearing a First Speaker in Conference Audio

In some embodiments, a second participant starts speaking before the first speaker stops speaking. If the other participants continue to hear the first speaker in the normal conference audio, they have the option of hearing both speakers mixed together. The speakers may be separated by different positions in a stereo image. Alternatively, the conference audio may be stopped and replaced with playback of the first speaker from the time at which the second speaker starts. Then, audio from the second and any subsequent speakers may be played until the listeners are caught up to real time. When the listeners are caught up, they may be automatically joined back into the conference audio mix.

Option of Hearing a First Speaker in Playback

In some embodiments, waiting time is eliminated by ensuring all participants finish either speaking or listening to the sequence at the same time. In this case, all participants may select the voicechat mode as playback. In some cases, all participants are automatically switched to playback mode when any of the participants begin speaking over each other. Remaining in voicechat mode during the conference causes the participants to listen to a conference in which every speaker appears to speak in turn. Advantageously, voicechat mode ensures that no speaker has to wait to speak, and that no one is interrupted. The voicechat mode may be particularly useful when the voice connections are peer to peer without the need to utilize a conference service on a central server.

Each Speaker May Record his or her Voice Only

With the introduction and adoption of webrtc, conference services using peer to peer connections will be increasingly prevalent. It may be desirable for each participant to record his own voice and no one else's. In this manner, the systems and methods described herein may ensure that each person or assignee has ownership and control of his own utterances, and such utterances are each person's or assignee's own property. Thus, each person may control the sharing of the clips through shared playlists, chat messages, and/or emails with links to clips. In some embodiments, the clips may be communicated directly between participants for playing, but the receiving participants may not be able to copy or save the clip or audio selection onto their personal devices. The clips may be configured to be capable of being saved only to a personal device associated with the speaker in the clip. In some implementations, the media signals for each speaker may be stored in files on a storage space that the speaker controls himself. If the speaker wishes to allow other users to listen to his media content, the speaker may provide the other users access to certain metadata associated with the media signals and provide permission to the other users to access the media signals. For example, the metadata may include presentations or a video of a screen sharing used during the conference. In an example, the other users are only given access to play the content, but not to copy the content and store them on other devices. In this case, the speaker may update the permissions by removing permissions for one or more users after initially providing access.

Use of a Caching Server

In some embodiments, Internet traffic is reduced through the use of a caching server. By using the caching server, each peer needs to transmit each clip only once, and the other peers may obtain the clips from the caching server. The clips may be encrypted when first recorded on the speaker's peer system and only decrypted when played on his system or on another authorized peer system. In particular, only authorized users may be permitted to participate in certain protected conferences. In such conferences, all channels may be encrypted such that they may not be played to a user unless the user has the appropriate conference key, individual speaker key, or both.

Broadcasting Feature

In some embodiments, participants start in voicechat mode, see each other in the roster, and elect to speak in conference. In a broadcasting mode, the same audio is played to all participants as soon as possible. In the broadcasting mode, participants may send audio or visual messages to one another. The messages may be transmitted at a lower volume or with an alert tone and/or text message or presence flag.

Use Cases

Below are several use cases which may be implemented with the features described herein. Any of the features may be implemented manually, automatically, or a combination of both.

In a first use case, a user participates in a conference using the voicechat mode. In this case, the voicechat mode allows all users to speak whenever they have a thought and hear everyone else's thoughts played one at a time. Preconditions in this case include turning autoplay on in sequential mode with streaming, applying filters to new messages to hear all speakers except oneself (or an omit-self option for autoplay), and setting set auto join to be on, and speed to 130% (or 115%, 100%, or any other suitable speed). In another example, a gadget may be used for recording and playback, though the gadget may not omit a user's own utterances or have speed-up options. In another example, a phone connection with touch tones to select options may be used to select to not hear a user's own messages. Moreover, the touch tones may be used to start and stop recording (in this case a SOX mediated read may be used to speed up like the player). A user may be listening to playback and catch up with the conference volume down and mute on. To speak, the user may select a pause button and unmute button. When the user is finished speaking, the user may select to mute himself, and then the play button to resume listening to the conference. In some embodiments, a roster such as is shown in FIG. 13 is used so that the participants may determine where the other participants are in the conversation.

In a second use case, a user plays back the audio clips during the conference. In particular, the user may wish to replay recent messages while in conference without missing anything. This case may arise if the subject matter is complex, or if the user was distracted by an interruption for example. Preconditions in this case include setting auto join on and speed to 130% (or 115%, 100% or any other suitable speed). When the user wishes to wish to replay a clip, the user may hang up the conference call and set the filters to hear speakers he wishes to replay (including optionally omitting himself). The user then plays the clips from the point at which he wishes to start, may select to skip any unwanted messages, and when he decides he has heard enough, plays to or skips to the end to rejoin the call. In some embodiments, a roster such as is shown in FIG. 13 is used so that the participants may determine where the other participants are in the conversation. In particular, the roster may display an indication that a user has left the live conference and has gone back to replay a previous portion of the conference.

In a third use case, an original user wishes to speak while another user is speaking, and what the original user wishes to say may affect what the other user is saying. Preconditions in this case include setting the scroll mode to latest, setting auto play on and being caught up, where playback volume is down, speed is set to 130% (or 115%, 100%, or any other suitable speed), filters are set to hear all speakers except himself (or selecting an omit self option), and having have sequential play on (or natural play). When the other user is speaking and the original user wants to be heard as well, the original user may turn the conference volume down, press pause, unmute himself, and speak. When the original user is finished speaking, he may press mute, turn playback volume up, and start play. After the original user is caught up, the conference volume may be turned up, and playback volume may be turned down. The other participants may react as the following examples (or these may be automated by the systems and methods herein). The first speaker, upon hearing another speaker, may turn his conference volume down and pause playback. When he finishes speaking, he starts play omitting himself, with playback volume up. When he catches up he turns down his play volume and turns up his conference volume. Upon detecting another speaker in parallel, other participants may turn their conference volume down and play volume up, and the reverse when they are caught up. In some embodiments, the system may download a speaker's own utterances even though they are not played immediately, so that the utterances may be cached in the speaker's browser for future use.

In a fourth use case, a user is in a conference, and while someone else speaks, the user wants to hear what the other person has to say, but has a related thought to contribute and does not want to lose the thought. Preconditions for this use case include that the user is in the conference, background autoplay is on so play volume is down and conference volume is up. The user speaks the thought using single message reply by muting conference and lowering conference volume, clicking a reply button in a widget so that the user replies to the most recent message being played. Playback is paused, the call is answered, the user speaks the thought and hangs up the call. The user may then return to the conference by raising the playback volume and restarting playback at accelerated speed. When the user is caught up to real time, the user may raise the conference volume and lower the playback volume. At a convenient moment in the conference, the user may restate the thought or play it back into the conference by locating the reply in the playlist, unmuting the conference, increasing the playback volume, and playing the reply. Then the user may return to the normal conference by lowering the playback volume and restoring autoplay. In some embodiments, the system may assist the user in finding an appropriate moment to inject the thought before the flow of the conversation moves on.

In a fifth use case, a user joins a conference late and wants to catch up. In this case, the user may start play with speed up by speaker and possibly filter by speaker with autojoin on. When the user is called into the conference, the user may stop play or let it continue in the background at low or no volume to be able to do other things.

In a sixth use case, a user wishes to join a conference when his agenda item comes up. In this case, the systems and methods of the present disclosure may provide an agenda linked to threads for each item. The user may play the thread from the agenda item with auto play on, such that the user may hear a signal when his agenda item is up. This implementation requires that the participants indicate they are associated with particular agenda items. Optionally, the user may select to have autojoin on so that the user is brought into the conference when the messages in the user's thread start.

In a seventh use case, when a user is listening to a playback of a conference that has previously been recorded, the user may wish to continue the conference by recording additional utterances. This may be implemented in a mode referred to conference continuation mode, in which the user may record additional utterances to continue the thread of discussion and update the conference. Later, when the user or other users listen to the playback of the conference, the user's additional utterances are included in the playback. In an example, the additional utterances may be added at the beginning, middle, or end of the original conference, and redirection tags may be inserted automatically so that later listeners are redirected to the additional utterances at the proper time.

Playback of conference clips may be through the conference connection in place of the usual conference mix on the out channel. Alternatively it can be by media playing in various formats such as provided by HTML. In this case it is helpful to stream the playback so that it can catch up to users speaking including while clips are being recorded. During streaming audio processing may be undertaken by audio utilities included in the streaming process such as SoX (Sound eXchange), which is a well known Unix utility. A simple streaming technique may be implemented using the following steps.

1. set up
    a. read file and note size or last position
    b. pass to SOX
        i. sleep long enough for SOX to do some processing, e.g. 100 msecs
        ii. pass output of SOX to browser
        iii. repeat steps i and ii until there is no more output from SOX
    c. sleep long enough for speaker to record more audio, e.g. 1 second
    d. repeat steps a, b, and c until file size has not grown
2. close down.

Figure 14:
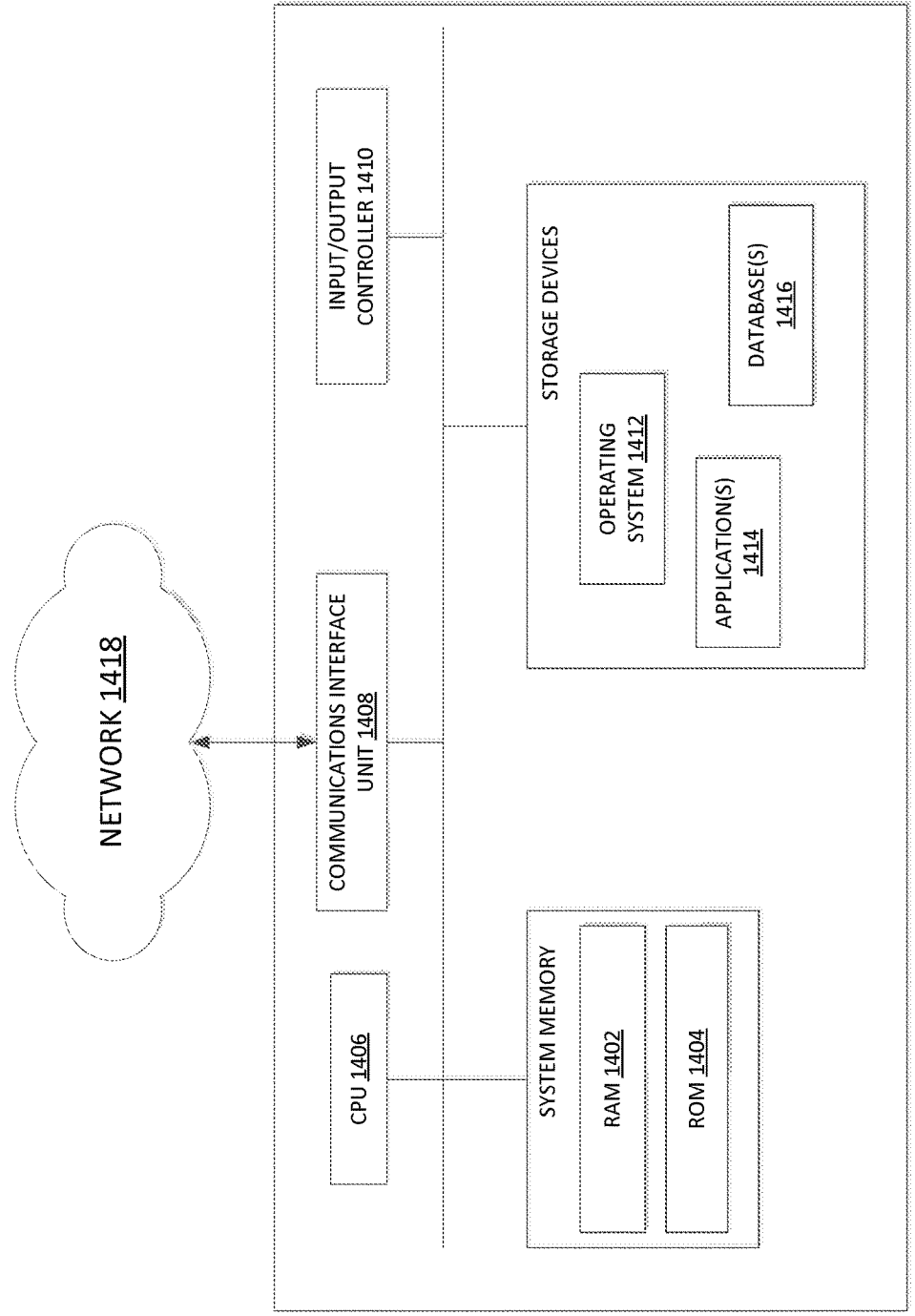
FIG. 14 is a block diagram of a computerized system for performing any of the techniques described herein, in accordance with an implementation of the disclosure.

FIG. 14 is a block diagram of a computing device, such as any of the components of the system of FIG. 1, for performing any of the processes described herein. Each of the components of these systems may be implemented on one or more computing devices 1400. In certain aspects, a plurality of the components of these systems may be included within one computing device 1400. In certain implementations, a component and a storage device may be implemented across several computing devices 1400.

The computing device 1400 comprises at least one communications interface unit, an input/output controller 1410, system memory, and one or more data storage devices. The system memory includes at least one random access memory (RAM 1402) and at least one read-only memory (ROM 1404). All of these elements are in communication with a central processing unit (CPU 1406) to facilitate the operation of the computing device 1400. The computing device 1400 may be configured in many different ways. For example, the computing device 1400 may be a conventional standalone computer or alternatively, the functions of computing device 1400 may be distributed across multiple computer systems and architectures. In FIG. 14, the computing device 1400 is linked, via network or local network, to other servers or systems.

The computing device 1400 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1408 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1406 comprises a processor, such as one or more conventional microprocessors and one or more supplementary co-processors such as math co-processors for offloading workload from the CPU 1406. The CPU 1406 is in communication with the communications interface unit 1408 and the input/output controller 1410, through which the CPU 1406 communicates with other devices such as other servers, user terminals, or devices. The communications interface unit 1408 and the input/output controller 1410 may include multiple communication channels for simultaneous communication with, for example, other processors, servers or client terminals.

The CPU 1406 is also in communication with the data storage device. The data storage device may comprise an appropriate combination of magnetic, optical or semiconductor memory, and may include, for example, RAM 1402, ROM 1404, flash drive, an optical disc such as a compact disc or a hard disk or drive. The CPU 1406 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1406 may be connected to the data storage device via the communications interface unit 1408. The CPU 1406 may be configured to perform one or more particular processing functions.

The data storage device may store, for example, (i) an operating system 1412 for the computing device 1400; (ii) one or more applications 1414 (e.g., computer program code or a computer program product) adapted to direct the CPU 1406 in accordance with the systems and methods described here, and particularly in accordance with the processes described in detail with regard to the CPU 1406; or (iii) database(s) 1416 adapted to store information that may be utilized to store information required by the program.

The operating system 1412 and applications 1414 may be stored, for example, in a compressed, an uncompiled and an encrypted format, and may include computer program code. The instructions of the program may be read into a main memory of the processor from a computer-readable medium other than the data storage device, such as from the ROM 1404 or from the RAM 1402. While execution of sequences of instructions in the program causes the CPU 1406 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions described herein. The program also may include program elements such as an operating system 1412, a database management system and "device drivers" that allow the processor to interface with computer peripheral devices (e.g., a video display, a keyboard, a computer mouse, etc.) via the input/output controller 1410.

The term "computer-readable medium" as used herein refers to any non-transitory medium that provides or participates in providing instructions to the processor of the computing device 1400 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1406 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1400 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A method for processing audio content, the method comprising:
   providing, by at least one processor, audio content comprising a first utterance obtained from a first call participant to a second call participant;
   detecting a start of a second utterance by the second call participant;
   in response to detecting the start of the second utterance, stopping the providing the audio content comprising the first utterance to the second call participant;
   storing, in a memory, an indication of a point in the audio content comprising the first utterance was stopped;
   detecting an end of the second utterance by the second call participant; and
   in response to detecting the end of the second utterance, resuming the providing the audio content comprising the first utterance to the second call participant at or just prior to the point referenced by the indication, wherein the first utterance is spoken by the first call participant and the second utterance is spoken by the second call participant during a call between the first call participant and the second call participant.

2. The method of claim 1, further comprising in response to detecting an end of the first utterance, providing audio content comprising the second utterance to the first call participant.

3. The method of claim 1, wherein the first call participant and the second call participant are the only call participants in the call.

4. The method of claim 1, wherein the first utterance and the second utterance overlap at least partially during a time interval, the providing the audio content comprising the first utterance to the second call participant is stopped during the time interval, the method further comprising storing the first utterance during the time interval, and storing the second utterance during the time interval.

5. The method of claim 4, wherein the storing the first utterance during the time interval includes obtaining a first recording, and the storing the second utterance during the time interval includes obtaining a second recording.

6. The method of claim 4, wherein after the providing the audio content comprising the first utterance to the second call participant is complete, the first utterance during the time interval is no longer stored.

7. The method of claim 1, wherein the audio content provided to the second call participant is different from audio content provided to the first call participant.

8. A system for processing audio content, the system comprising controller circuitry configured to:
provide audio content comprising a first utterance obtained from a first call participant to a second call participant;
detect a start of a second utterance by the second call participant;
in response to detecting the start of the second utterance, stop the providing the audio content comprising the first utterance to the second call participant;
store, in a memory, an indication of a point in the audio content comprising the first utterance was stopped;
detect an end of the second utterance by the second call participant; and
in response to detecting the end of the second utterance, resume the providing the audio content comprising the first utterance to the second call participant at or just prior to the point referenced by the indication, wherein the first utterance is spoken by the first call participant and the second utterance is spoken by the second call participant during a call between the first call participant and the second call participant.

9. The system of claim 8, wherein the controller circuitry is further configured to, in response to detecting an end of the first utterance, provide audio content comprising the second utterance to the first call participant.

10. The system of claim 8, wherein the first call participant and the second call participant are the only call participants in the call.

11. The system of claim 8, wherein the first utterance and the second utterance overlap at least partially during a time interval, the controller circuitry stops providing the audio content comprising the first utterance to the second call participant during the time interval, the controller circuitry is further configured to store the first utterance during the time interval, and store the second utterance during the time interval.

12. The system of claim 11, wherein the controller circuitry is configured to store the first utterance during the time interval as a first recording, and to store the second utterance during the time interval as a second recording.

13. The system of claim 11, wherein after the audio content comprising the first utterance is provided to the second call participant, the first utterance during the time interval is no longer stored.

14. The system of claim 8, wherein the audio content provided to the second call participant is different from audio content provided to the first call participant.

* * * * *